(12) United States Patent
Shim et al.

(10) Patent No.: US 10,665,144 B2
(45) Date of Patent: May 26, 2020

(54) DISPLAY DEVICE AND VEHICLE HAVING THE SAME

(71) Applicant: LG ELECTRONICS INC., Seoul (KR)

(72) Inventors: Inkoo Shim, Seoul (KR); Kyunglack Kim, Seoul (KR); Sangwon Kim, Seoul (KR); Kyoungjune Shin, Seoul (KR); Youshin Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/114,647

(22) Filed: Aug. 28, 2018

(65) Prior Publication Data

US 2019/0164463 A1    May 30, 2019

(30) Foreign Application Priority Data

Nov. 29, 2017    (KR) .......................... 10-2017-0162203

(51) Int. Cl.
 *B60K 35/00*    (2006.01)
 *G02B 27/01*    (2006.01)
 (Continued)

(52) U.S. Cl.
 CPC .............. *G09G 3/02* (2013.01); *B60K 35/00* (2013.01); *B60K 37/02* (2013.01);
 (Continued)

(58) Field of Classification Search
 CPC . G09G 3/02; G09G 5/003; G09G 5/38; B60K 35/00; G02B 27/0101; G02B 27/0149
 See application file for complete search history.

(56) References Cited

U.S. PATENT DOCUMENTS

| 5,639,151 A | 6/1997 | McNelley et al. |
| 2002/0021461 A1* | 2/2002 | Ono .................... G02B 5/0252 359/13 |

(Continued)

FOREIGN PATENT DOCUMENTS

| EP | 2410756 A2 | 1/2012 |
| JP | 2009-192434 A | 8/2009 |

(Continued)

OTHER PUBLICATIONS

Machine translated JP2017-149354 (IDS) (Year: 2017).*

*Primary Examiner* — Sing-Wai Wu
(74) *Attorney, Agent, or Firm* — Birch, Stewart, Kolasch & Birch, LLP

(57) ABSTRACT

A display device for a vehicle including: a first display configured to output first light forming first visual information; a second display configured to output second light forming second visual information; a light synthesizing unit located on an advancing path of each of the first light and the second light and forming a first acute angle with the first display and a second acute angle with the second display and configured to transmit therethrough the first light from the first display and reflect the second light from the second display; a first tiltable reflector; a second tiltable reflector; and a driving unit configured to: tilt the first tiltable reflector to form a first angle with the second display so the first tiltable reflector reflects part of the second light directed toward the light synthesizing unit toward a first direction, and tilt the second tiltable reflector to form a second angle with the first display so the second tiltable reflector reflects part of the first light directed toward the light synthesizing unit toward a second direction different from the first direction.

19 Claims, 22 Drawing Sheets

(51) Int. Cl.
*G09G 3/02* (2006.01)
*G09G 5/00* (2006.01)
*G09G 5/38* (2006.01)
*B60K 37/02* (2006.01)
*G06K 9/00* (2006.01)
*G09G 5/373* (2006.01)

(52) U.S. Cl.
CPC ..... *G02B 27/0101* (2013.01); *G02B 27/0149* (2013.01); *G09G 5/003* (2013.01); *G09G 5/38* (2013.01); *B60K 2370/1531* (2019.05); *B60K 2370/1534* (2019.05); *B60K 2370/23* (2019.05); *B60K 2370/27* (2019.05); *B60K 2370/31* (2019.05); *B60K 2370/33* (2019.05); *B60K 2370/334* (2019.05); *B60K 2370/347* (2019.05); *G02B 2027/014* (2013.01); *G02B 2027/0141* (2013.01); *G02B 2027/0159* (2013.01); *G06K 9/00791* (2013.01); *G09G 5/373* (2013.01); *G09G 2320/028* (2013.01); *G09G 2340/0492* (2013.01); *G09G 2354/00* (2013.01); *G09G 2380/10* (2013.01)

(56) References Cited

U.S. PATENT DOCUMENTS

| | | | |
|---|---|---|---|
| 2012/0008048 A1* | 1/2012 | Sekine | G06T 19/006 348/566 |
| 2015/0268468 A1 | 9/2015 | Masuda et al. | |
| 2015/0379773 A1 | 12/2015 | Konishi et al. | |
| 2017/0246956 A1 | 8/2017 | Hall | |
| 2017/0337024 A1 | 11/2017 | Imanishi | |

FOREIGN PATENT DOCUMENTS

| | | |
|---|---|---|
| JP | 10-2014-0134184 A | 11/2014 |
| JP | 2016-159779 A | 9/2016 |
| JP | 10-2017-0091083 A | 8/2017 |
| JP | 2017-149354 A | 8/2017 |

* cited by examiner (a)

(b)

(a)

(b)

[FIRST STATE]

[SECOND STATE]

[FIRST STATE]

[SECOND STATE]

[THIRD STATE]

[FIRST STATE]

[SECOND STATE]

[FOURTH STATE]

DISPLAY DEVICE AND VEHICLE HAVING THE SAME

CROSS-REFERENCE TO RELATED APPLICATION

This application claims the benefit of Korean Patent Application No. 10-2017-0162203, filed in the Republic of Korea on Nov. 29, 2017, the entirety of which is incorporated herein by reference.

BACKGROUND OF THE INVENTION

1. Field of the Invention

The present invention relates to a display device outputting driving information related to a vehicle, and a vehicle having the same.

2. Description of the Related Art

A vehicle refers to a means of transporting people or goods by using kinetic energy. Representative examples of vehicles include automobiles and motorcycles. For safety and convenience of a user who uses the vehicle, various sensors and devices are provided in the vehicle, and functions of the vehicle are diversified. The functions of the vehicle may be divided into a convenience function for promoting a driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver by ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

As the functions of the vehicle are diversified, various types of driving information are provided. Driving information for the safety function needs to be intuitively transmitted to the driver as compared with driving information for the convenience function.

SUMMARY OF THE INVENTION

Accordingly, one aspect of the present invention is to address the above noted and other problems of the related art.

Another aspect of the present invention is to provide a display device in a vehicle and configured to perform communication with at least one processor provided in the vehicle.

To achieve these and other advantages and in accordance with the purpose of the present invention, as embodied and broadly described herein, the present invention provides in one aspect a display device for a vehicle including: a first display configured to output first light forming first visual information; a second display configured to output second light forming second visual information; a light synthesizing unit located on an advancing path of each of the first light and the second light and forming a first acute angle with the first display and a second acute angle with the second display and configured to transmit therethrough the first light from the first display and reflect the second light from the second display; a first tiltable reflector; a second tiltable reflector; and a driving unit configured to: tilt the first tiltable reflector to form a first angle with the second display so the first tiltable reflector reflects part of the second light directed toward the light synthesizing unit toward a first direction, and tilt the second tiltable reflector to form a second angle with the first display so the second tiltable reflector reflects part of the first light directed toward the light synthesizing unit toward a second direction different from the first direction.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
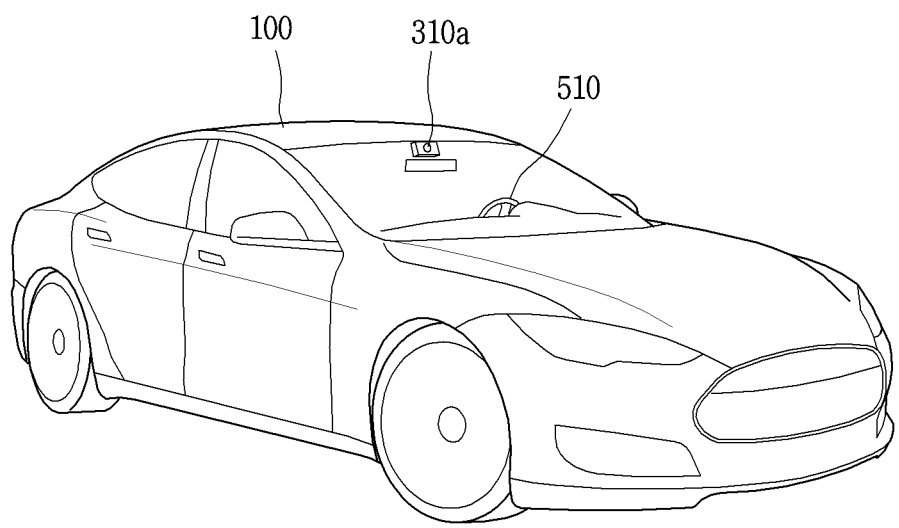
FIG. 1 is a view illustrating a vehicle in accordance with an embodiment of the present invention.
Figure 1:
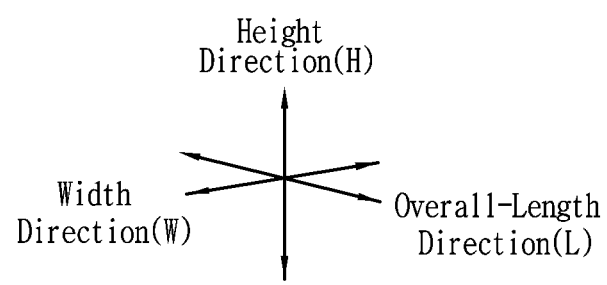
Figure 2:
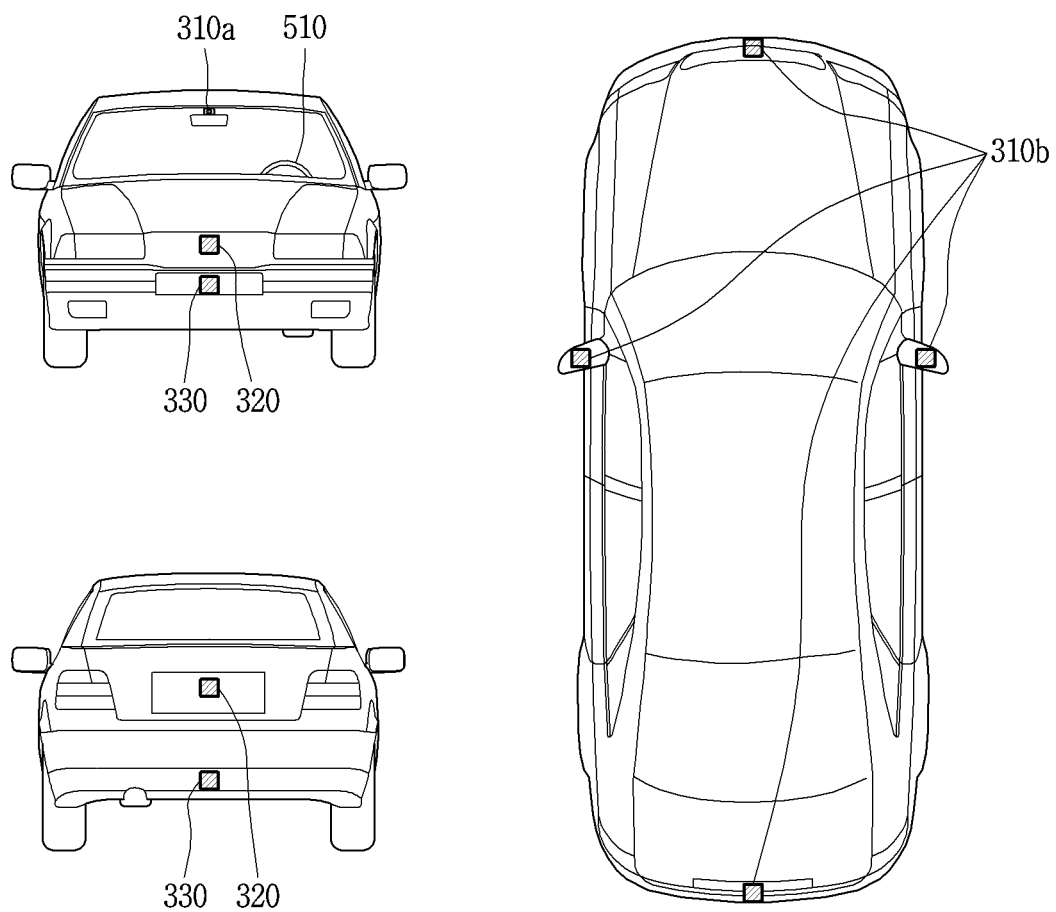
FIG. 2 is a view illustrating a vehicle at various angles in accordance with an embodiment of the present invention.
Figure 3:
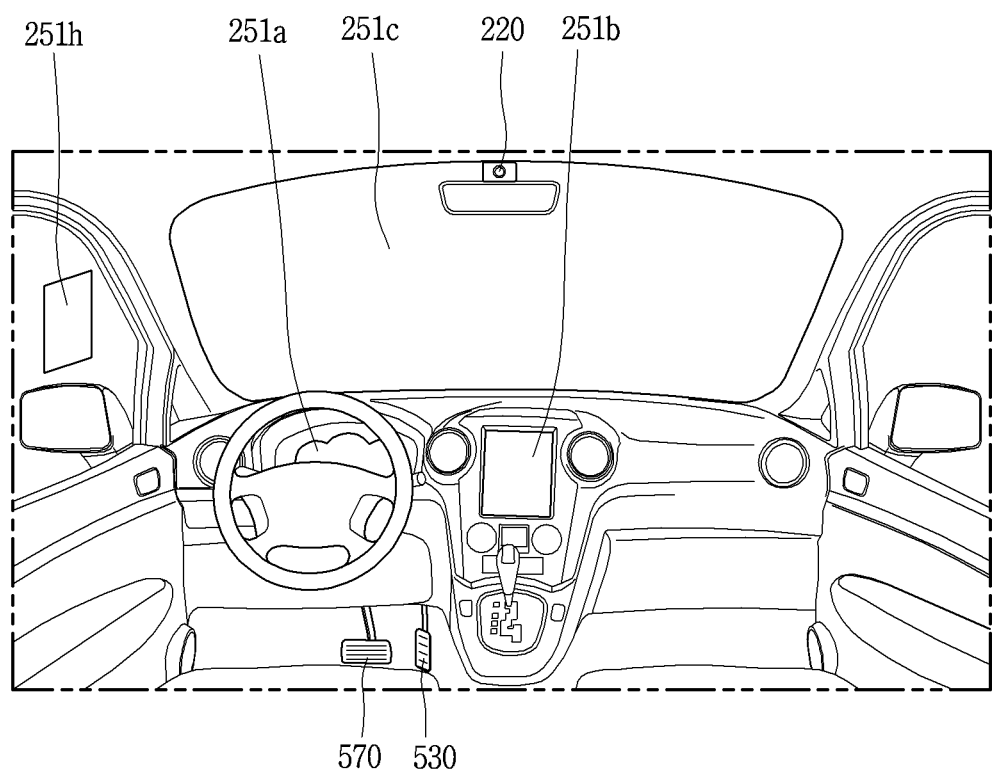
FIGS. 3 and 4 are views illustrating an inside of a vehicle in accordance with an embodiment of the present invention.
Figure 4:
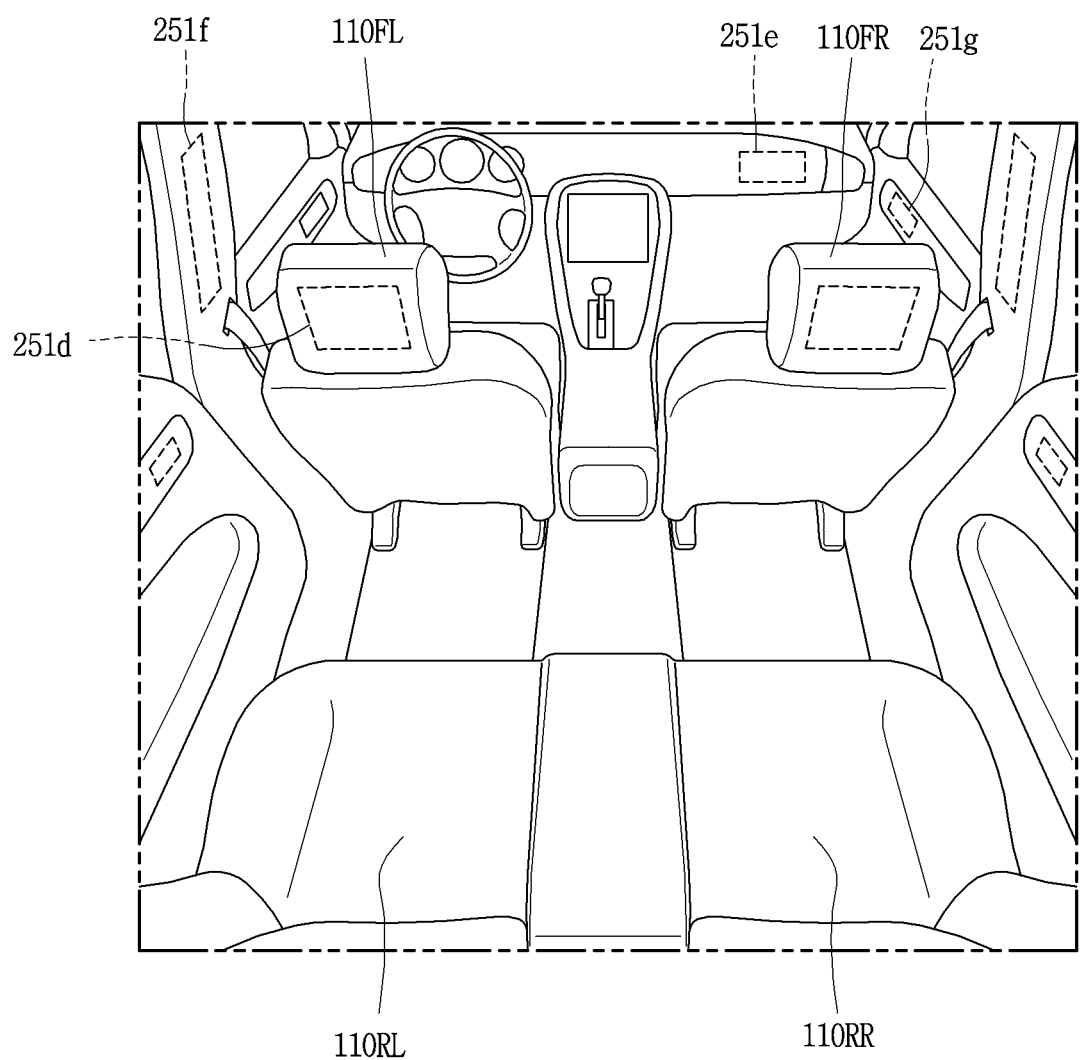

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car. The vehicle according to the embodiment of the present invention may be a conception including all of an internal combustion engine car having an engine as a power source, a hybrid vehicle having an engine and an electric motor as power sources, an electric vehicle having an electric motor as a power source, and the like. In the following description, a left side of a vehicle refers to a left side in a driving direction of the vehicle, and a right side of the vehicle refers to a right side in the driving direction.

As illustrated in FIGS. 1 to 7, a vehicle 100 may include wheels that are turned by a driving force, and a steering apparatus 510 for adjusting a driving (ongoing, moving) direction of the vehicle 100. The vehicle 100 may be an autonomous vehicle defined as controlling at least one of acceleration, deceleration, and driving direction based on a preset algorithm. In other words, the autonomous driving refers to a driving control apparatus that is automatically manipulated even without a user input applied to the driving control apparatus.

The vehicle 100 may be switched into an autonomous mode or a manual mode based on a user input. For example, the vehicle may be switched from the manual mode into the autonomous mode or from the autonomous mode into the manual mode based on a user input received through a user interface apparatus 200.

Figure 7:
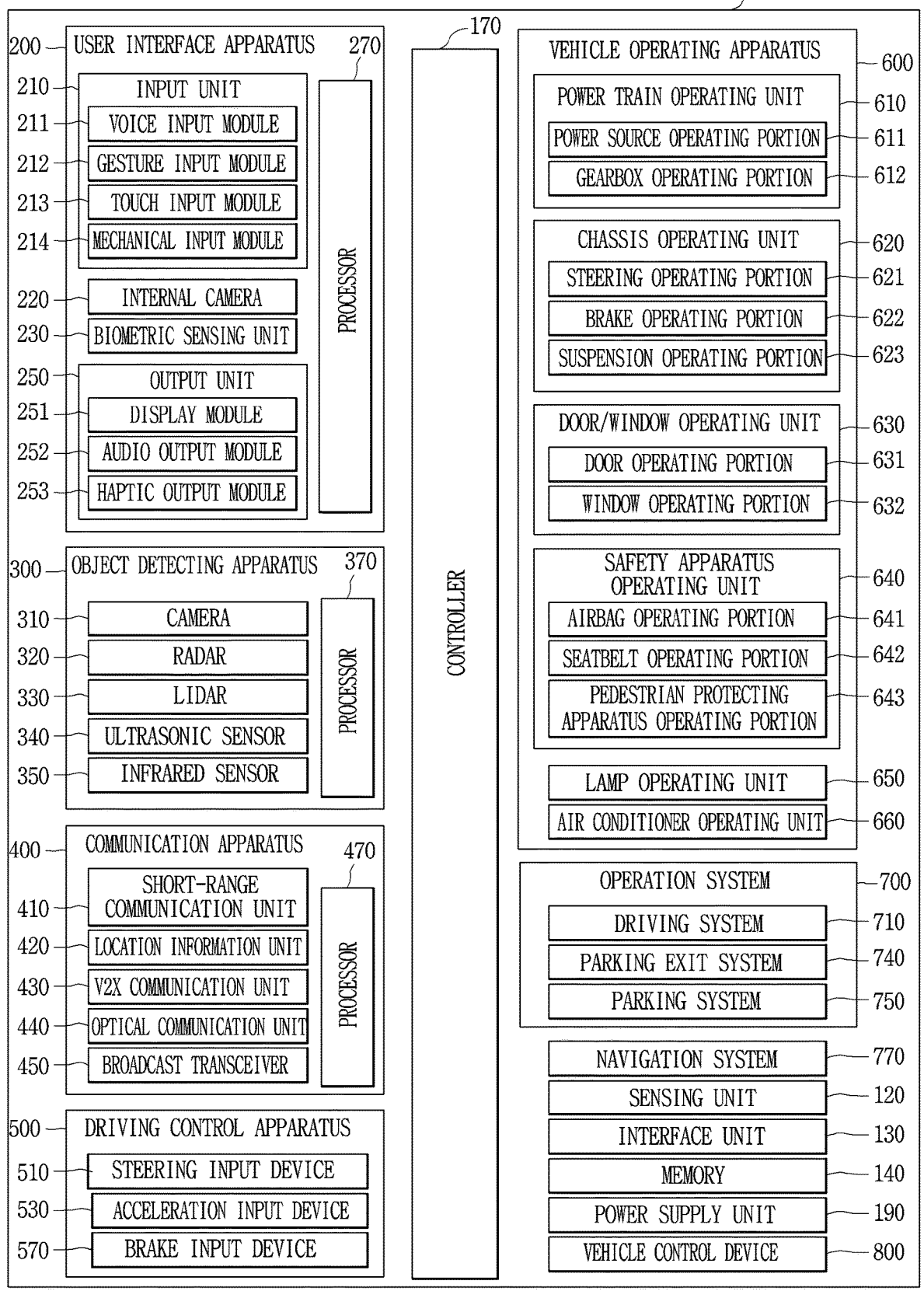
FIG. 7 is a block diagram illustrating a vehicle in accordance with an embodiment of the present invention.

In addition, the vehicle 100 may be switched into the autonomous mode or the manual mode based on driving environment information. In more detail, the driving environment information may be generated based on object information provided from an object detecting apparatus 300 (FIG. 7). For example, the vehicle 100 may be switched from the manual mode into the autonomous mode or from the autonomous mode into the manual mode based on driving environment information generated in the object detecting apparatus 300.

For example, the vehicle 100 may be switched from the manual mode into the autonomous mode or from the autonomous mode into the manual mode based on driving environment information received through a communication apparatus 400. The vehicle 100 may be switched from the manual mode into the autonomous mode or from the autonomous mode module into the manual mode based on information, data or signal provided from an external device.

When the vehicle 100 is driven in the autonomous mode, the autonomous vehicle 100 can be driven based on an operation system 700. For example, the autonomous vehicle 100 can be driven based on information, data or a signal generated in a driving system 710, a parking exit system 740 and a parking system 750. When the vehicle 100 is driven in the manual mode, the autonomous vehicle 100 can receive a user input for driving through a driving control apparatus 500. The vehicle 100 can also be driven based on the user input received through the driving control apparatus 500.

In addition, an overall length refers to a length from a front end to a rear end of the vehicle 100, a width refers to a width of the vehicle 100, and a height refers to a length from a bottom of a wheel to a roof. In the following description, an overall-length direction L refers to a direction which is a criterion for measuring the overall length of the vehicle 100, a width direction W refers to a direction that is a criterion for measuring a width of the vehicle 100, and a height direction H refers to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190. The vehicle 100 may include more components in addition to components to be explained in this specification or may not include some of those components to be explained in this specification.

In addition, the user interface apparatus 200 is for communication between the vehicle 100 and a user. The user interface apparatus 200 can receive a user input and provide information generated in the vehicle 100 to the user. Further, the vehicle 200 may implement user interfaces (UIs) or user experiences (UXs) through the user interface apparatus 200. As shown in FIG. 7, the user interface apparatus 200 may include an input unit 210, an internal camera 220, a biometric sensing unit 230, an output unit 250 and a processor 270. The user interface apparatus 200 may include more components in addition to components to be explained in this specification or may not include some of those components to be explained in this specification.

The input unit 210 allows the user to input information. Data collected in the input unit 210 can be analyzed by the processor 270 and processed as a user's control command. The input unit 210 may also be disposed inside the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like. Further, the input unit 210 may include a voice input module 211, a gesture input module 212, a touch input module 213, and a mechanical input module 214.

The voice input module 211 converts a user's voice input into an electric signal. The converted electric signal may be provided to the processor 270 or the controller 170. The voice input module 211 may also include at least one microphone.

In addition, the gesture input module 212 converts a user's gesture input into an electric signal. The converted electric signal may be provided to the processor 270 or the controller 170. The gesture input module 212 may also include at least one of an infrared sensor and an image sensor for detecting the user's gesture input. Further, the gesture input module 212 may detect a user's three-dimensional (3D) gesture input. Thus, the gesture input module 212 may also include a light emitting diode outputting a plurality of infrared rays or a plurality of image sensors. The gesture input module 212 may detect the user's 3D gesture input by a time of flight (TOF) method, a structured light method or a disparity method.

Further, the touch input module 213 converts the user's touch input into an electric signal and provides the converted electric signal to the processor 270 or the controller 170. The touch input module 213 may also include a touch sensor for detecting the user's touch input. Further, according to an embodiment, the touch input module 213 can be integrated with the display module 251 to implement a touch screen providing an input interface and an output interface between the vehicle 100 and the user.

In addition, the mechanical input module 214 may include at least one of a button, a dome switch, a jog wheel and a jog switch. An electric signal generated by the mechanical input module 214 may be provided to the processor 270 or the controller 170. Further, the mechanical input module 214 may be arranged on a steering wheel, a center fascia, a center console, a cockpit module, a door and the like.

The internal camera 220 can acquire an internal image of the vehicle and the processor 270 can detect a user's state based on the internal image of the vehicle. The processor 270 can also acquire information related to the user's gaze from the internal image of the vehicle and detect a user gesture from the internal image of the vehicle.

In addition, the biometric sensing unit 230 can acquire the user's biometric information and can include a sensor for detecting the user's biometric information and acquire fingerprint information and heart rate information regarding the user using the sensor. The biometric information can also be used for user authentication.

Further, the output unit 250 generates an output related to a visual, audible or tactile signal. The output unit 250 may include at least one of a display module 251, an audio output module 252 and a haptic output module 253.

The display module 251 can output graphic objects corresponding to various types of information. The display module 251 may include at least one of a liquid crystal display (LCD), a thin film transistor-LCD (TFT LCD), an organic light-emitting diode (OLED), a flexible display, a three-dimensional (3D) display and an e-ink display. The display module 251 may be inter-layered or integrated with a touch input module 213 to implement a touch screen or may be implemented as a head up display (HUD). When the display module 251 is implemented as the HUD, the display module 251 is provided with a projecting module to output information through an image that is projected on a windshield or a window. The display module 251 may include a transparent display attached to the windshield or the window. The transparent display also has a predetermined degree of transparency and outputs a predetermined screen thereon. The transparent display may include at least one of a thin film electroluminescent (TFEL), a transparent OLED, a transparent LCD, a transmissive transparent display and a transparent LED display. The transparent display may also have adjustable transparency.

In addition, the user interface apparatus 200 may include a plurality of display modules 251a to 251h. The display module 251 may be disposed on one area of a steering wheel, one area 251a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. Thus, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200. According to an embodiment, the user interface apparatus 200 may include a plurality of processors 270 or may not include any processor 270. When the processor 270 is not included in the user interface apparatus 200, the user interface apparatus 200 may operate according to a control of a processor of another apparatus within the vehicle 100 or the controller 170. In addition, the user interface apparatus 200 may be called a display apparatus for a vehicle. The user interface apparatus 200 may operate according to the control of the controller 170.

The object detecting apparatus 300 is an apparatus for detecting an object located at outside of the vehicle 100. The object may be a variety of objects associated with driving (operation) of the vehicle 100.

Figure 5:
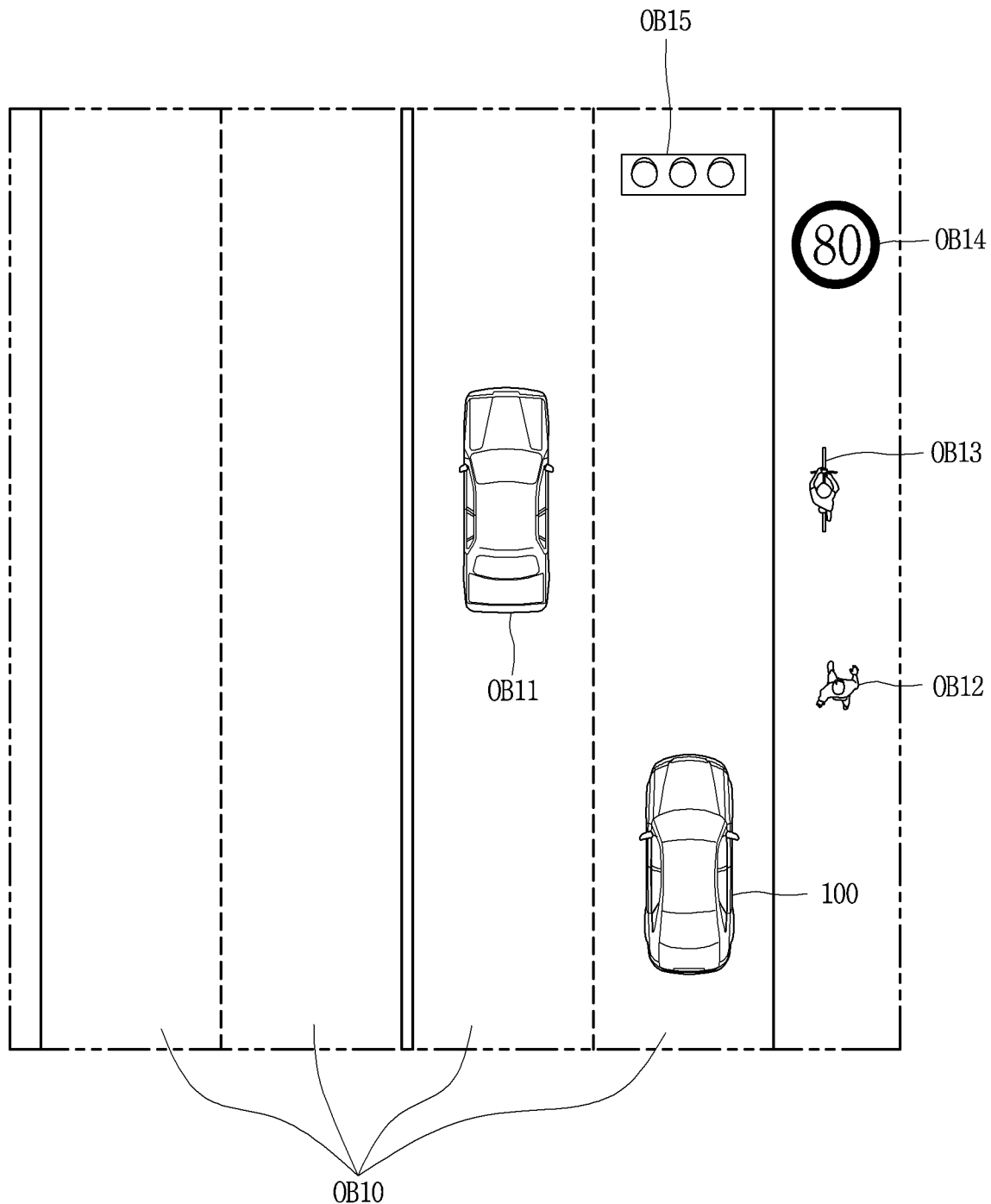
FIGS. 5 and 6 are reference views illustrating objects in accordance with an embodiment of the present invention.
Figure 6:
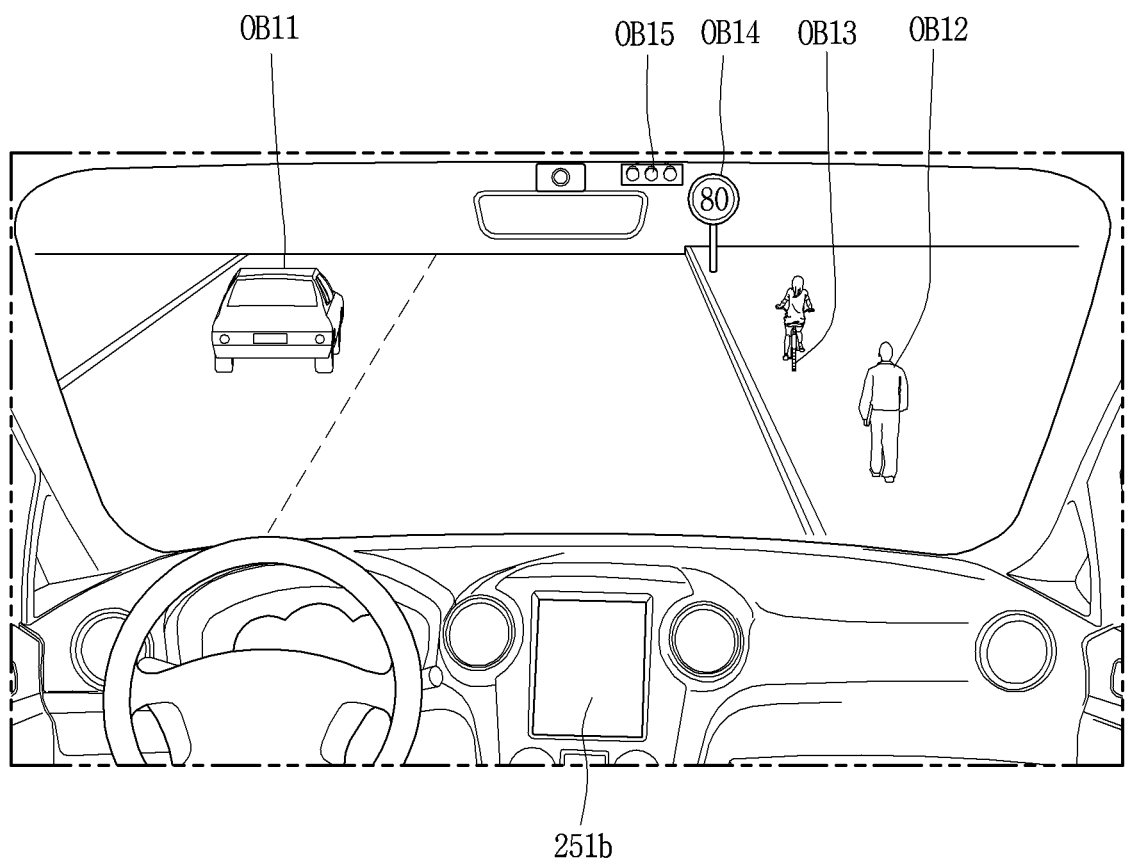

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle comes in an opposite direction to the vehicle 100. The lane OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface. The light may be light emitted from a lamp provided on another vehicle. The light may be light generated from a streetlamp. The light may be solar light. The road may include a road surface, a curve, an upward slope, a downward slope and the like. The structure may be an object that is located near a road and fixed on the ground. For example, the structure may include a streetlamp, a roadside tree, a building, an electric pole, a traffic light, a bridge and the like. The terrain may include a mountain, a hill and the like.

In addition, an object may be classified as a moving object or a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370. According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera. For example, the camera 310 may be disposed adjacent to a front windshield within the vehicle to acquire a front image of the vehicle. Or, the camera 310 may be disposed adjacent to a front bumper or a radiator grill. For example, the camera 310 may be disposed adjacent to a rear glass within the vehicle to acquire a rear image of the vehicle. Or, the camera 310 may be disposed adjacent to a rear bumper, a trunk or a tail gate. For example, the camera 310 may be disposed adjacent to at least one of side windows within the vehicle to acquire a side image of the vehicle. Or, the camera 310 may be disposed adjacent to a side mirror, a fender or a door. The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift keying (FSK) manner according to a signal waveform, among the continuous wave radar methods. The radar 320 may detect an object in a time of flight (TOF) manner or a phase-shift manner through the medium of the electric wave, and detect a position of the detected object, a distance from the detected object and a relative speed with the detected object. The radar 320 may be disposed on an appropriate position outside the vehicle for detecting an object that is located at a front, rear or side of the vehicle.

The LiDAR 330 may include laser transmitting and receiving portions. The LiDAR 330 may be implemented in a time of flight (TOF) manner or a phase-shift manner. The LiDAR 330 may be implemented as a drive type or a non-drive type. For the drive type, the LiDAR 330 may be rotated by a motor and detect object near the vehicle 100. For the non-drive type, the LiDAR 330 may detect, through light steering, objects which are located within a predetermined range based on the vehicle 100. The vehicle 100 may include a plurality of non-drive type LiDARs 330. The LiDAR 330 may detect an object in a TOP manner or a phase-shift manner through the medium of a laser beam, and detect a position of the detected object, a distance from the detected object and a relative speed with the detected object. The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object. The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object. The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed of the object and the like, through an image processing algorithm.

The processor 370 may detect an object based on a reflected electromagnetic wave from an emitted electromagnetic wave that is reflected from the object, and track the object. The processor 370 may execute operations, such as a calculation of a distance from the object, a calculation of a relative speed of the object and the like, based on the electromagnetic wave.

The processor 370 may detect an object based on a reflected laser beam from an emitted laser beam that is reflected from the object, and track the object. The processor 370 may execute operations, such as a calculation of a distance from the object, a calculation of a relative speed of the object and the like, based on the laser beam.

The processor 370 may detect an object based on a reflected ultrasonic wave from an emitted ultrasonic wave that is reflected from the object, and track the object. The processor 370 may execute operations, such as a calculation of a distance from the object, a calculation of a relative speed of the object and the like, based on the ultrasonic wave.

The processor may detect an object based on reflected infrared light from emitted infrared light that is reflected from the object, and track the object. The processor 370 may execute operations, such as a calculation of a distance from the object, a calculation of a relative speed of the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor 370 in an individual manner. When the processor 370 is not included in the object detecting apparatus 300, the object detecting apparatus 300 may operate according to the control of a processor of an apparatus within the vehicle 100 or the controller 170. The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a 'wireless communication unit'. The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470. According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal. According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400. According to an embodiment, the communication apparatus 400 may include a plurality of processors 470 or may not include any processor 470. When the processor 470 is not included in the communication apparatus 400, the communication apparatus 400 may operate according to the control of a processor of another device within the vehicle 100 or the controller 170. In addition, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus. The communication apparatus 400 may operate according to the control of the controller 170.

The driving control apparatus 500 is an apparatus for receiving a user input for driving. In a manual mode, the vehicle 100 may be operated based on a signal provided by the driving control apparatus 500. The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100. The vehicle operating apparatus 600 may include a power train operating unit 610, a chassis operating unit 620, a door/window operating unit 630, a safety apparatus operating unit 640, a lamp operating unit 650, and an air-conditioner operating unit 660. According to some embodiments, the vehicle operating apparatus 600 may further include other components in addition to the components described, or may not include some of the components described. In addition, the vehicle operating apparatus 600 may include a processor. Each unit of the vehicle operating apparatus 600 may individually include a processor.

The power train operating unit 610 may control an operation of a power train device. The power train operating unit 610 may include a power source operating portion 611 and a gearbox operating portion 612.

The power source operating portion 611 may perform a control for a power source of the vehicle 100. For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170. For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox. The gearbox operating portion 612 may adjust a state of the gearbox. The gearbox operating portion 612 can change the state of the gearbox into drive (forward) (D), reverse (R), neutral (N) or parking (P). In addition, when an engine is the power source, the gearbox operating portion 612 may adjust a locked state of a gear in the drive (D) state.

The chassis operating unit 620 may control an operation of a chassis device. The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 can change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100. In addition, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road. In addition, the suspension operating portion 623 may individually control each of a plurality of suspensions.

The door/window operating unit 630 may perform an electronic control for a door apparatus or a window apparatus within the vehicle 100. The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor. The vehicle operating apparatus 600 may operate according to the control of the controller 170.

The operation system 700 is a system that controls various driving modes of the vehicle 100. The operation system 700 may operate in an autonomous driving mode. The operation system 700 may include a driving system 710, a parking exit system 740 and a parking system 750. According to embodiments, the operation system 700 may further include other components in addition to components to be described, or may not include some of the components to be described.

In addition, the operation system 700 may include a processor. Each unit of the operation system 700 may individually include a processor. According to embodiments, the operation system may be a sub concept of the controller 170 when it is implemented in a software configuration. In addition, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100. The driving system 710 may receive navigation information from a navigation system 770, transmit a control signal to the vehicle operating apparatus 600, and perform driving of the vehicle 100. The driving system 710 may receive object information from the object detecting apparatus 300, transmit a control signal to the vehicle operating apparatus 600 and perform driving of the vehicle 100. The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot. The parking exit system 740 may receive navigation information from the navigation system 770, transmit a control signal to the vehicle operating apparatus 600, and perform the exit of the vehicle 100 from the parking lot. The parking exit system 740 may receive object information from the object detecting apparatus 300, transmit a control signal to the vehicle operating apparatus 600 and perform the exit of the vehicle 100 from the parking lot. The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100. The parking system 750 may receive navigation information from the navigation system 770, transmit a control signal to the vehicle operating apparatus 600, and park the vehicle 100. The parking system 750 may receive object information from the object detecting apparatus 300, transmit a control signal to the vehicle operating apparatus 600 and park the vehicle 100. The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle. The navigation system 770 may include a memory and a processor. The memory may store the navigation information. The processor may control an operation of the navigation system 770. According to embodiments, the navigation system 770 may update prestored information by receiving information from an external device through the communication apparatus 400. According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like. The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like. The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal. In addition, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170. According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, a display device 800 provided in the vehicle 100 will be described in detail. The display device 800 is provided in the vehicle 100, and may be implemented as an independent device detachable from the vehicle 100 or as a part of the vehicle 100 that is integrally installed in the vehicle 100. The display device may refer to the display module 251 described above with reference to FIG. 7.

Hereinafter, for the sake of explanation, description will be given of an example of the display device 800 that is a separate component independent of the display module 251 of the vehicle 100. However, this is only an embodiment of the present invention, and all the operation and control method of the display device 800 described in this specification may alternatively be performed by the controller 170 of the vehicle 100. That is, the operation and/or control method performed by a processor 860 of the display device 800 may be performed by the controller 170 of the vehicle 100.

The present invention will illustrate an example in which the display device 800 is a cluster that is disposed at a driver's seat and provides various types of vehicle driving information to the driver. However, the present invention is not limited thereto. For example, the display device 800 may be disposed at various locations within the vehicle 100 to provide various information.

Figure 8A:
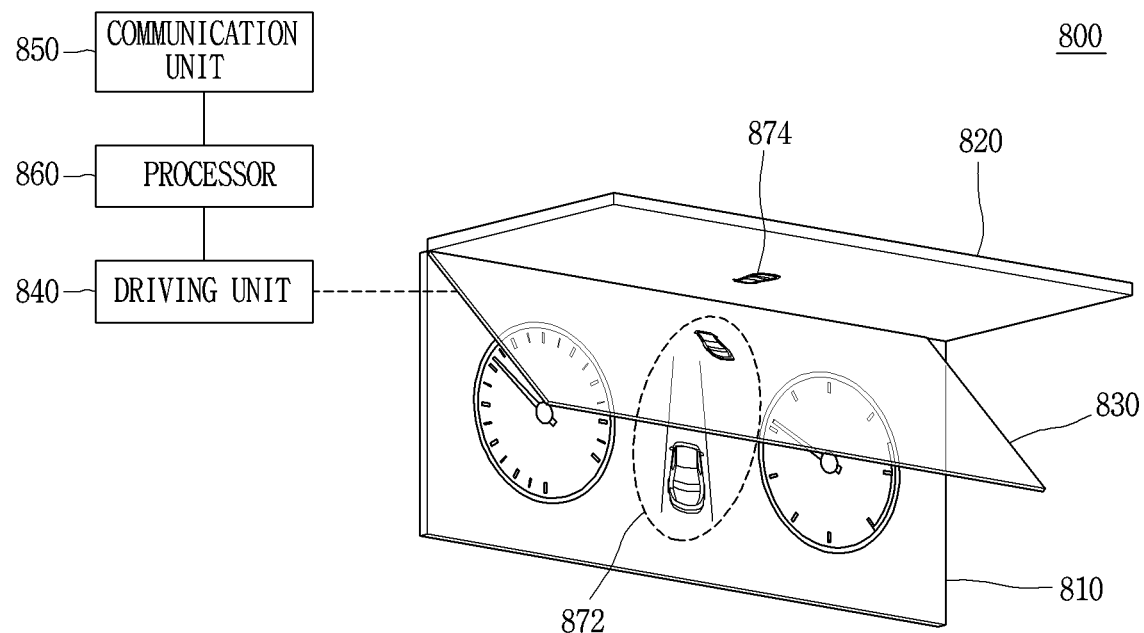
FIG. 8A is a block diagram illustrating a display device according to one embodiment of the present invention.
Figure 8B:
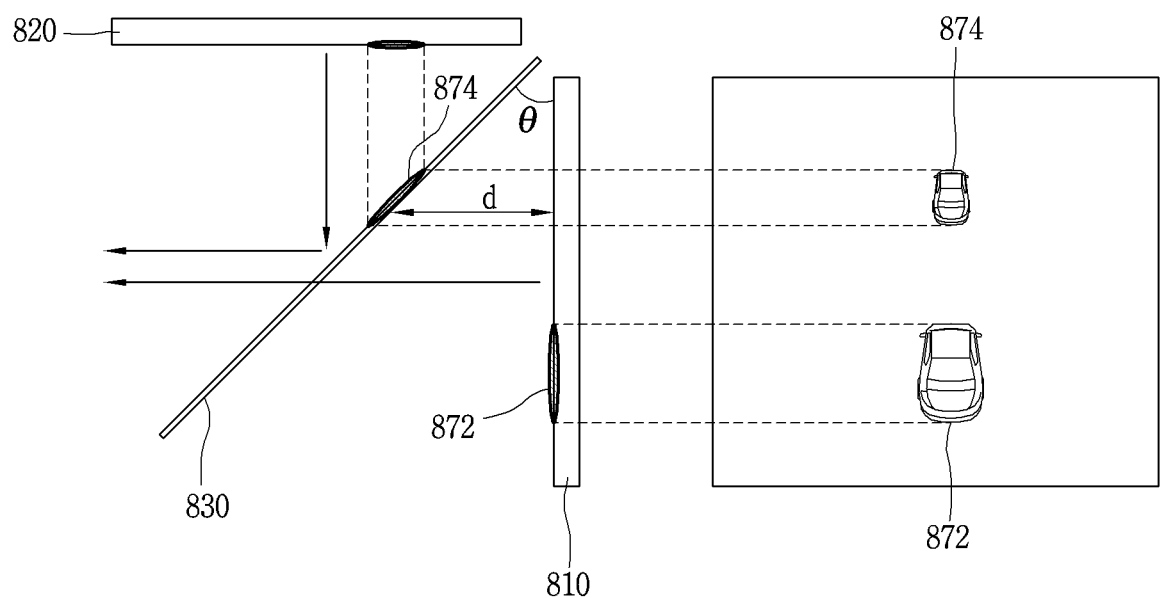
FIG. 8B is a diagram illustrating a side view and a front view of the display device of FIG. 8A in accordance with an embodiment of the present invention.

FIG. 8A is a conceptual view illustrating a display device according to one embodiment of the present invention, and FIG. 8B is a side view and a front view of the display device 800 of FIG. 8A. Referring to FIG. 8A, the display device 800 may include at least one of a communication unit 850, a first display 810, a second display 820, a light synthesizing unit 830, a processor 860, and a driving unit 840.

The communication unit 850 is configured to perform communication with the various components described in FIG. 7. For example, the communication unit 850 may receive various information provided through a controller area network (CAN). In another example, the communication unit 850 may perform communication with all devices performing communication, such as a vehicle, a mobile terminal, a server, and another vehicle. This may be referred to as Vehicle to everything (V2X) communication. The V2X communication may be defined as technology of exchanging or sharing information, such as traffic condition and the like, while communicating with a road infrastructure and other vehicles during driving.

The communication unit 850 may receive information related to the driving of the vehicle from most of the devices provided in the vehicle 100. The information transmitted from the vehicle 100 to the display device 800 is referred to as 'vehicle driving information (or vehicle travel information)'.

The vehicle driving information includes vehicle information and surrounding information related to the vehicle. Information related to the inside of the vehicle based on the frame of the vehicle 100 may be defined as the vehicle information, and information related to the outside of the vehicle may be defined as the surrounding information.

The vehicle information refers to information related to the vehicle itself. For example, the vehicle information may include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user.

The surrounding information refers to information related to another object located within a predetermined range around the vehicle, and information related to the outside of the vehicle. The surrounding information of the vehicle may be a state of a road surface the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may include ambient brightness, temperature, a position of the sun, information related to nearby subject (a person, another vehicle, a sign, etc.), a type of a driving road surface, a landmark, line information, and driving lane information, and information for an autonomous driving/autonomous parking/automatic parking/manual parking mode. In addition, the surrounding information may further include a distance from an object existing around the vehicle to the vehicle 100, collision possibility, a type of an object, a parking space for the vehicle, an object for identifying the parking space (for example, a parking line, a string, another vehicle, a wall, etc.), and the like.

The vehicle driving information is not limited to the example described above and may include all information generated from the components provided in the vehicle 100.

The first and second displays 810 and 820 may output various information under the control of the processor 860 provided in the display device 800. For example, the first display 810 may output first light that forms first visual information, and the second display 820 may output second light that forms second visual information. The first and second visual information may relate to the aforementioned vehicle driving information. The displays 810 and 820 may include at least one of a liquid crystal display (LCD), a thin film transistor-LCD (TFT LCD), an organic light-emitting diode (OLED), a flexible display, a three-dimensional (3D) display, and an e-ink display.

The first display 810 can be oriented toward a first direction and the second display 820 can be oriented toward a second direction perpendicular to the first direction. The second direction indicates a direction forming an angle of a predetermined range approximately perpendicular to the first direction. In addition, the first direction can be a direction facing the driver's eyes when the driver is seated in the driver's seat, and the second direction can be a direction having a predetermined first angle with respect to the first direction. In one example, the second direction may be a gravitational direction. According to the arrangement of the first and second displays 810 and 820, the first display 810 enters the driver's view but the second display 820 is out of the driver's view when the driver is seated in the driver's seat.

In addition, the light synthesizing unit 830 is located on an advancing path of each of the first light and the second light. Specifically, the light synthesizing unit 830 forms a first acute angle with the first display 810 and a second acute angle with the second display 820. The first acute angle and the second acute angle may be the same angle or different angles. One end of the light synthesizing unit 830 can be located adjacent to the first and second displays 810 and 820. Also, the light synthesizing unit 830 can be arranged between the first and second displays 810 and 820 by being farther away from the first and second displays 810 and 820 from one end of the light synthesizing unit 830 toward another end of the light synthesizing unit 830.

Further, the light synthesizing unit 830 allows the first light to transmit through the light synthesizing unit 830 and reflects the second light between the first and second displays 810 and 820 so that the first light and the second light are directed to the same path as shown in FIG. 8B. In other words, the light synthesizing unit 830 synthesizes the first light and the second light so that the first light and the second light are directed to the same optical path. The light synthesis unit 830 may be a mirror such as a half mirror, a translucent filter, and/or a dichroic mirror.

In addition, the second light generated in the second display 820 arranged to face the second direction is synthesized with the first light by the light synthesizing unit 830 to form synthesized light, which proceeds toward the first direction. For example, as illustrated in FIG. 8A, a first graphic object 872 can be displayed on the first display 810, and a second graphic object 874 can be displayed on the second display 820. Further, the first light corresponding to the first graphic object 872 is transmitted through the light synthesizing unit 830 without being reflected by the light synthesizing unit 830, to be intuitively perceived or recognized as being output from the first display 810. This is because the light synthesizing unit 830 is made transparent. Further, since the second light corresponding to the second graphic object 874 is reflected by the light synthesizing unit 830, the user can recognize that the second visual information is being displayed on the light synthesizing unit 830.

Referring to FIG. 8B, the user recognizes that the first graphic object 872 is located on the first display 810 and the second graphic object 874 is located on the light synthesizing unit 830. Accordingly, the first and second graphic objects 872 and 874 may have a distance therebetween as far as a distance d between the light synthesizing unit 830 and the first display 810.

Thus, the user can perceive the first and second graphic objects 872 and 874 as the second graphic object 874 is located above the first graphic object 872. The user can perceive the first and second graphic objects 872 and 874 as the second graphic object 874 is located closer to him/her than the first graphic object 872, or the first graphic object 872 is located farther away from him/her than the second graphic object 874. That is, the user can feel a three-dimensional (3D) depth due to the difference in position between the light synthesizing unit 830 and the first display 810.

Also, information output on each display can obtain 3D depth when the first visual information is displayed on the first display 810 and the second visual information is displayed on the second display 820 at the same time. Here, 'sense of depth' or 'depth value' refers to an index indicating a difference in distance between a virtual one point and an object displayed on the display device 800. A depth value of an object can be defined as "0" when the object displayed on the display device 800 is located at a predetermined point. A depth value of an object which seems to have a shape protruding from the predetermined point to outside of the display device 800 can be defined as a negative value, and a depth value of an object which seems to have an inwardly concave (recessed) shape can be defined as a positive value. Thus, the object is farther away from the predetermined point when an absolute value of the depth value is larger.

In addition, the depth value disclosed in the present specification is generated by the distance difference between the first display and the light synthesizing unit and can be defined as a perpendicular distance from a reference surface to the light synthesizing unit when the first display is used as the reference surface. Although the same graphic object is displayed in the same size, the graphic object has a different depth value according to an output position on the second display 820. This is because the light synthesizing unit 830 is positioned between the first and second displays 810 and 820 and one surface of the light synthesizing unit 830 forms a first angle θ with the first display 810. Hereinafter, the angle between the light synthesizing unit 830 and the first display 810 is defined as a 'first angle.'

If no information is displayed on the second display 820, the user is provided with information displayed on the first display 810 in a two-dimensional (2D) form. Further, when information is displayed on the second display 820, all information displayed on the first and second displays 810 and 820 can be provided in a three-dimensional (3D) form. Due to the difference in position between the light synthesizing unit 830 and the first display 810, the information displayed on the second display 820 has a different depth value depending on its output position.

Further, the processor 860 controls at least one of the first and second displays 810 and 820. Specifically, the processor 860 can determine whether or not at least one of a plurality of preset conditions is satisfied, based on vehicle driving information received through the communication unit 850. The processor 860 can also control at least one of the first and second displays 810 and 820 in a different way, to output information corresponding to the satisfied condition.

Also, in connection with the preset conditions, the processor 860 can detect an occurrence of an event in an electric component and/or application provided in the vehicle 100, and determine whether the detected event meets the preset condition. Further, the processor 860 can detect the occurrence of the event from the information received through the communication unit 850.

Also, an application is a concept including a widget, a home launcher, and the like, and refers to all types of programs that can be run on the vehicle 100. Accordingly, the application may be a program that performs a function of a web browser, a video playback, a message transmission/reception, a schedule management, or an application update. Further, the application may include a forward collision warning (FCW), a blind spot detection (BSD), a lane departure warning (LDW), a pedestrian detection (PD) A Curve Speed Warning (CSW), and a turn-by-turn navigation (TBT).

For example, the event occurrence may be a missed call, presence of an application to be updated, a message arrival, start on, start off, autonomous driving on/off, pressing of an LCD awake key, an alarm, an incoming call, a missed notification, and the like. As another example, the occurrence of the event may be a generation of an alert set in the advanced driver assistance system (ADAS), or an execution of a function set in the ADAS. For example, the occurrence of the event may be a generation of forward collision warning, a generation of a blind spot detection, a generation of lane departure warning, a generation of lane keeping assist warning, or an execution of autonomous emergency braking. As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine. In addition, even when various ECUs provided in the vehicle 100 perform specific functions, it may be determined as the occurrence of the event.

When the event satisfies a preset condition, the processor 860 controls the first display 810 and/or the second display 820 to output information corresponding to the satisfied condition. Also, when an event occurs, information related to the event can be provided to the passenger of the vehicle 100. The information displayed on the first display 810 and the information displayed on the second display 820 are distinguished from each other.

For example, general information to be provided to a passenger can be displayed on the first display 810 as main information, and sub information for emphasizing the main information can be displayed on the second display 820. In another example, the first display 810 can display the vehicle driving information, and the second display 820 can display a graphical object associated with the vehicle driving information. In another example, when a preset condition is satisfied while predetermined visual information is displayed on the first display 810, the processor 860 can move the predetermined visual information to the second display 820. In other words, the predetermined visual information that is being displayed on the first display 810 can stop being displayed and disappear from the first display 810 and then displayed on the second display 820.

Further, the processor 860 can display a graphic object corresponding to the vehicle driving information on the second display 820. In more detail, the graphic object corresponding to the vehicle driving information is for emphasizing information displayed on the first display 810, and may differ according to the information displayed on the first display 810. As another example, the graphic object may become a different graphic object depending on a type of event occurred. Here, the different graphic object, for example, may refer to an image having a different shape, length, color, or the like. The type of the graphic object displayed on the second display 820 can also vary according to the vehicle driving information displayed on the first display 810.

In addition, an output position of the graphic object on the second display 820 can vary depending on a driving situation of the vehicle. Here, the driving situation may relate to at least one of a position, acceleration, a running speed, and a running direction of the vehicle 100, and collision possibility with an external object. Since the vehicle is premised on movement, information provided in the vehicle has its own position data. For example, route guidance information has position data of a point for which a route guidance should be provided, and object information having possibility of collision has position data of a point where the object is located.

When displaying information with position data, it is preferable to effectively inform a passenger of a point corresponding to the position data. The display device 800 according to an embodiment of the present invention can effectively guide the point using the light synthesizing unit 830, which is disposed tilted to have a predetermined angle with respect to the first display 810. Specifically, the processor 860 of the display device 800 can adjust the output position of the information to have a different depth value depending on how far the point is away from the vehicle 100. This is because even the same information has a different depth value according to where (on which point) it is displayed on the second display 820.

For example, when the point is located within a first distance range, information to guide the point is output at a position away from one end of the second display 820 by a first distance. Further, when the point is located within a second distance range, the information to guide the point can be displayed at a position away from the one end of the second display 820 by a second distance farther than the first distance. Therefor, the passenger intuitively recognizes how far the point is located since the depth value differs according to the output position.

Figure 8C:
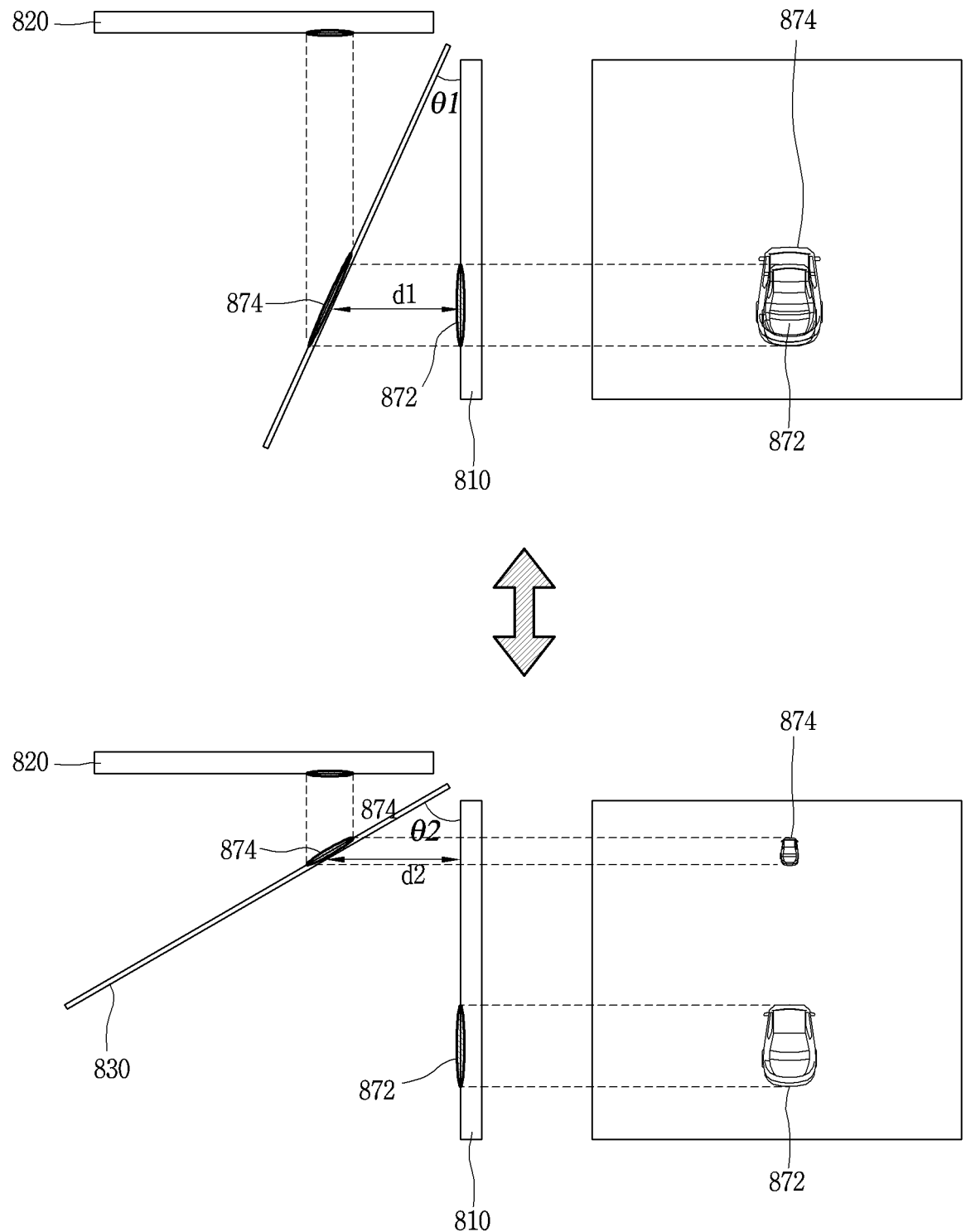
FIG. 8C is an exemplary view illustrating a change in three-dimensional depth according to tilting of a light synthesizing unit in accordance with an embodiment of the present invention.

Hereinafter, various embodiments in which the processor 860 outputs information having 3D depth using the second display 820 will be described with reference to the accompanying drawings. In particular, FIG. 8C is an exemplary view illustrating a change in 3D depth according to a tilting of the light synthesizing unit. In the display device 800 according to an embodiment of the present invention, the light synthesizing unit 830 can be tilted so that the reference angle between the light synthesizing unit 830 and the first display 810 varies.

Further, the driving unit 840 may include a rotation shaft for providing power and the light synthesizing unit 830 can be coupled to the rotation shaft to be tilted between the first and second displays 810 and 820. More specifically, the processor 860 controls the driving unit 840 such that the first angle is varied to a predetermined angle corresponding to a preset condition in response to the preset condition being satisfied. Specifically, when a preset condition is satisfied based on vehicle driving information received through the communication unit 850, the processor 860 can control the driving unit 840 accordingly. As the driving unit 840 is driven, the light synthesizing unit 830 rotates and accordingly the first angle between the light synthesizing unit 830 and the first display 810 changes according to the rotation.

In addition, even when the same graphic object is displayed on the second display 820, at least one of an output position and an output size of the graphic object recognized by the user is varied according to the first angle. Here, the output position and the output size indicate the position and size displayed on the second display 820. Further, information displayed on the second display 820 has an effect of being displayed on the first display 810 by being reflected by the light synthesizing unit 830. Thus, the output position and the output size may refer to a position and size on the first display 810 recognized by the user. That is, even if the output position and the output size are the same, at least one of the output position and the output size can vary according to the first angle.

For example, as illustrated in FIG. 8C, the first graphic object 872 can be displayed on the first display 810, and the second graphic object 874 can be displayed on the second display 820. The first and second graphic objects 872 and 874 also overlap each other at a first angle $\theta 1$. In this instance, when the output size of the second graphic object 874 is defined as a first size, the second graphic object 874 has a first depth value $d1$.

Further, the first and second graphic objects 872 and 874 can be displayed at different positions at a second angle $\theta 2$. The output size of the second graphic object 874 may be a second size, and the second graphic object 874 may have a second depth value $d2$.

In addition, the processor 860 can adjust the first angle to produce an effect of changing at least one of the output size and the output position of the information displayed on the second display 820. For example, when the tilting of the light synthesizing unit 830 is changed from the second angle $\theta 2$ to the first angle $\theta 1$, an effect that the second graphic object 874 gradually moves toward the first graphic object 872 is generated. Since the depth of the second graphic object 874 varies accordingly, a stereoscopic effect is generated.

The processor 860 can change the first angle according to the vehicle driving information. In this instance, the output position and the output size of the second graphic object 874 can change according to the first angle, in order to change only the 3D depth value of the second graphic object 874 in a state where the output position of the second graphic object 874 output on the second display 820 is fixed on the first display 810.

In order to generate various effects, at least one of the output position and the output size of the second graphic object 874 may also be changed at the same time of changing the first angle.

Accordingly, the processor can change at least one of the output size and the output position of the information currently displayed on the second display 820 by varying the first angle while maintaining the information.

Also, at least one of the output size and the output position of the information currently displayed on the second display 820 can be changed while maintaining the first angle.

In addition, at least one of the output size and the output position of the information currently displayed on the second display 820 can be changed while varying the first angle.

By the operation of the processor 860, various types of information can be displayed in a 3D manner having different depth values. The display device 800 according to an embodiment of the present invention may provide 3D vehicle driving information to a passenger according to one of various embodiments.

Hereinafter, the control method of the processor 860 will be described in more detail based on the structure of the display device 800, with reference to the accompanying drawings.

Figure 9:
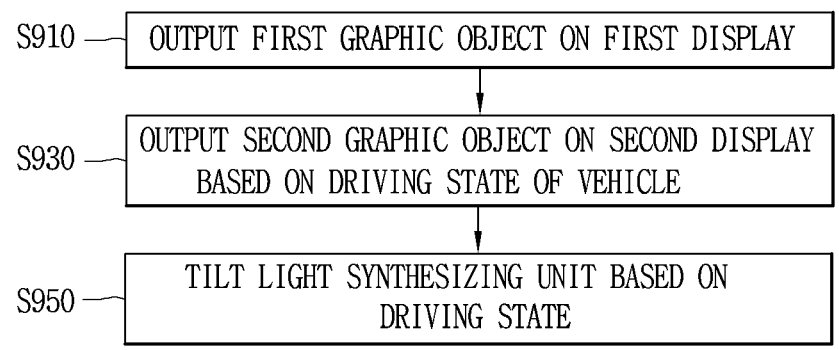
FIG. 9 is a flowchart illustrating a method of controlling a display device in accordance with an embodiment of the present invention.

FIG. 9 is a flowchart illustrating a method of controlling a display device according to an embodiment of the present invention.

First visual information can be displayed on the first display 810 according to vehicle driving information. For example, the first visual information may include a speedometer, an odometer, a tachometer, various warning lights, turn signal indicators, a fuel meter, event information for guiding an event occurring in the vehicle 100, and the like.

The second display 820 may be selectively turned on/off even when the first display 810 is turned on. For example, when a stereoscopic display mode is turned off in the vehicle 100, the second display 820 may be kept off. In another example, even when the stereoscopic display mode is turned on, the second display 820 may be kept off when there is no information to be provided to a passenger in a 3D manner.

Here, the stereoscopic display mode is defined as a state in which different types of information have different depth values and are displayed in a 3D manner through the light synthesizing unit 830 in a way of simultaneously displaying the different types of information on the first and second displays 810 and 820.

The light synthesizing unit 830 is formed to be tiltable, but may operate differently depending on whether the stereoscopic display mode is on or off. For example, when the stereoscopic display mode is turned on, the light synthesizing unit 830 is tilted in response to a preset condition being satisfied. However, when the stereoscopic display mode is turned off, the light synthesizing unit 830 is not tilted even when the preset condition is satisfied. The processor 860 controls the driving unit such that the light synthesizing unit 830 is not tilted even though the preset condition is satisfied when the stereoscopic display mode is turned off in the vehicle 100.

When the second display 820 is turned off, the light synthesizing unit 830 can be tilted such that the first angle has an initial setting value.

The second display 820 can display, as second visual information, information for emphasizing at least part of the first visual information displayed on the first display 810 and/or predetermined information to be guided to a passenger in a 3D manner regardless of the first visual information.

Various visual information can be displayed on the first and second displays 810 and 820. However, for convenience of explanation, the display device 800 according to an embodiment of the present invention will be described based on an example in which a first graphic object is displayed on the first display 810 and a second graphic object is displayed on the second display 820. However, the present invention is not limited to the first and second graphic objects, and a plurality of graphic objects may alternatively be displayed on or disappear from at least one of the first and second displays 810 and 820 according to the control of the processor 860.

Figure 10:
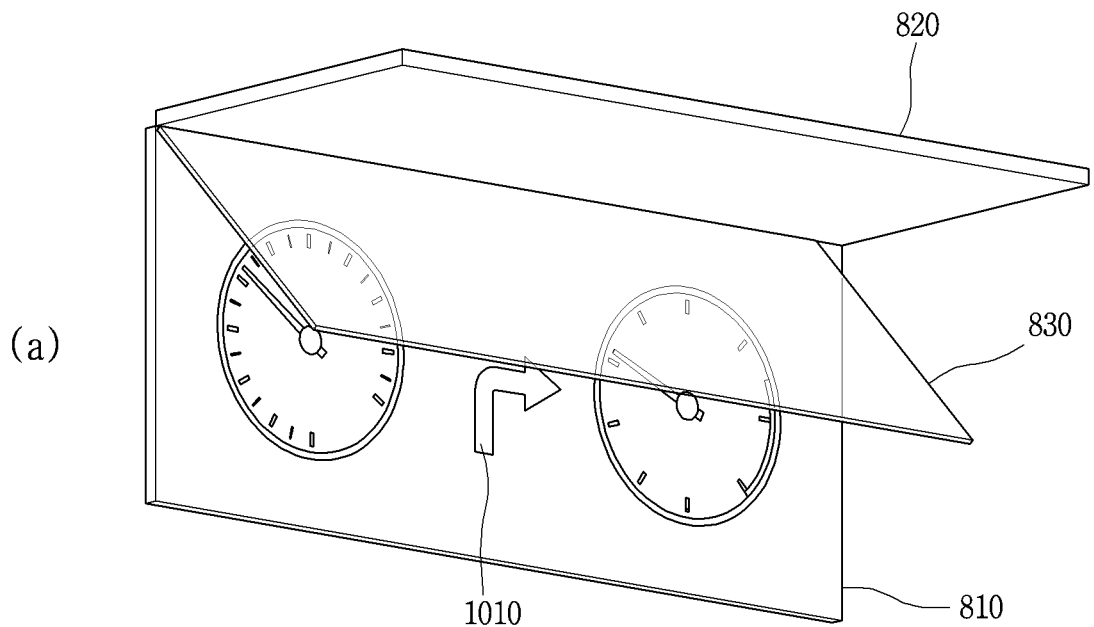
FIGS. 10 to 12 are exemplary views illustrating operations of the display device according to the control method of FIG. 9 in accordance with an embodiment of the present invention.
Figure 10:
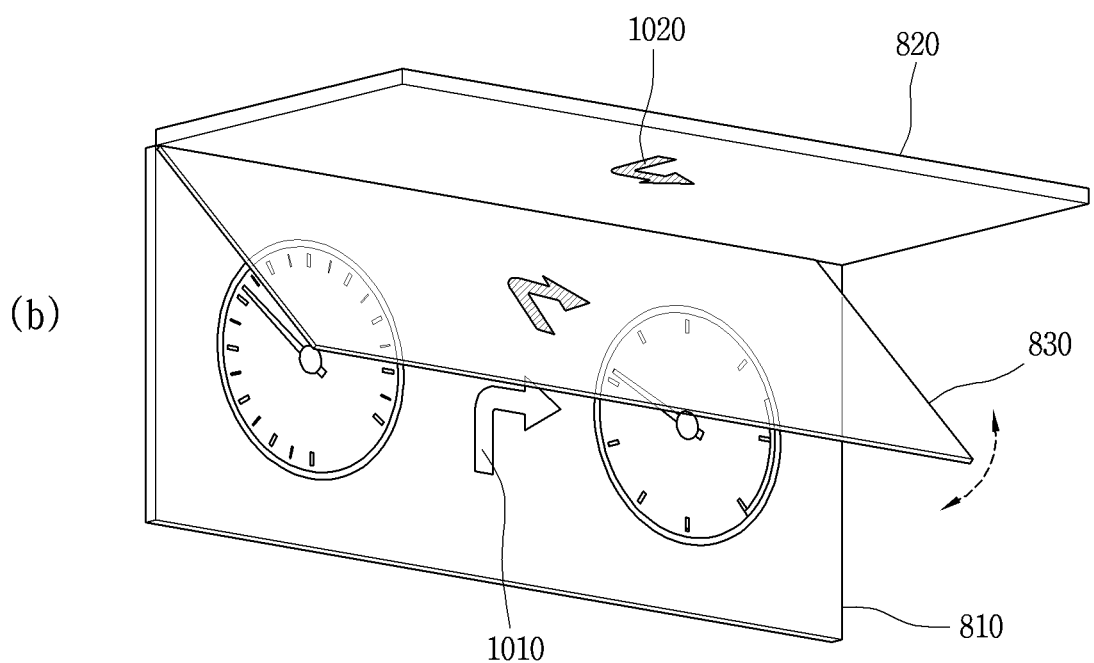
Figure 11:
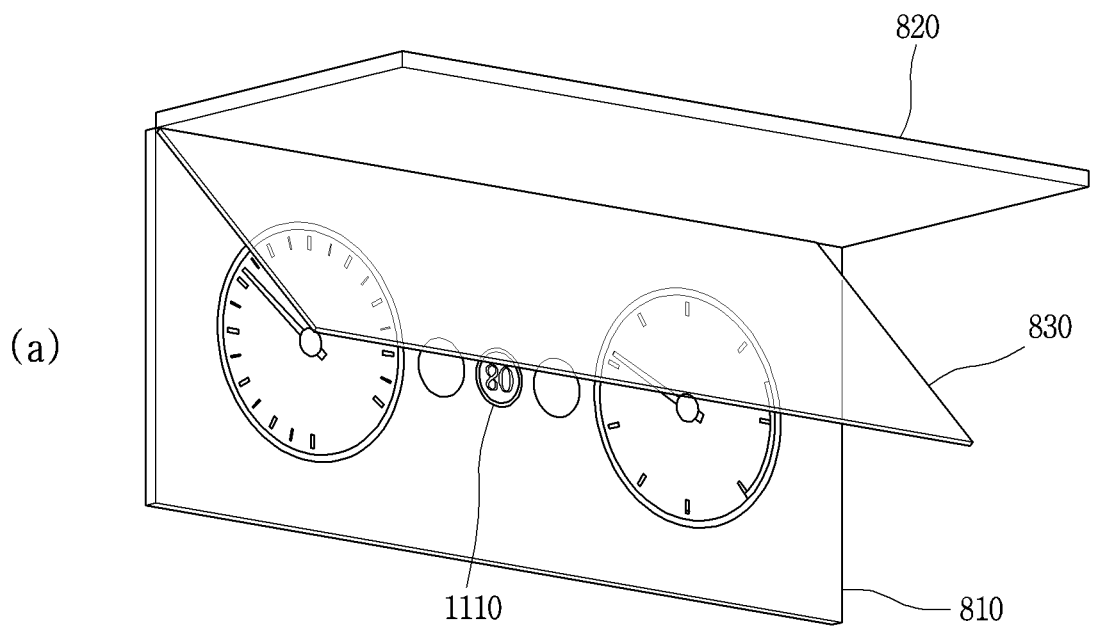
Figure 11:
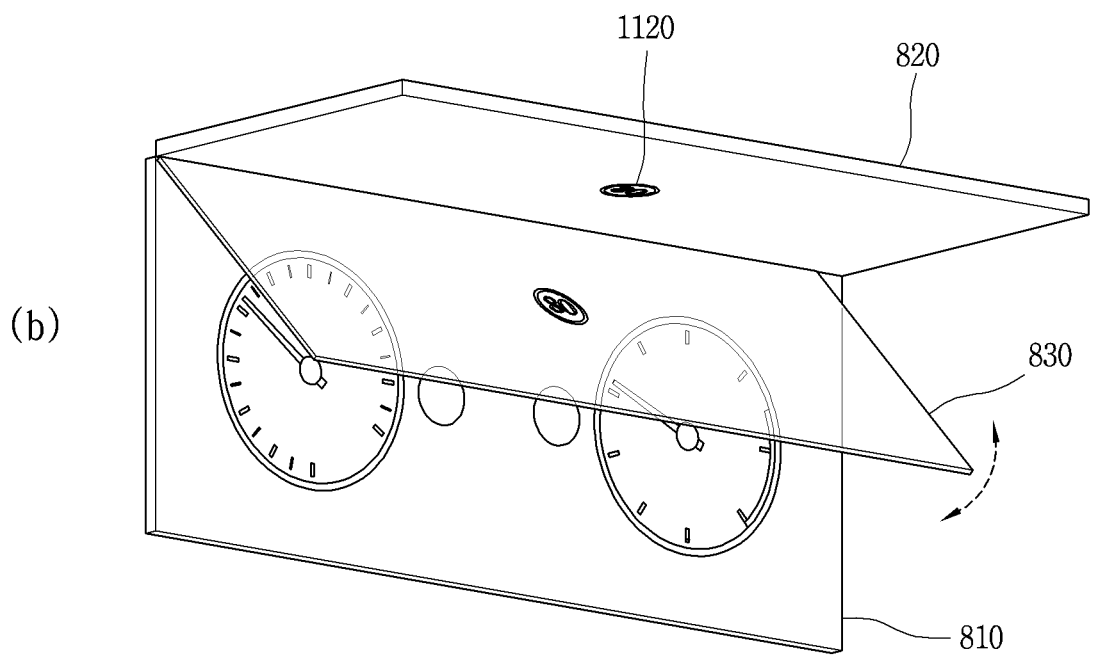
Figure 12:
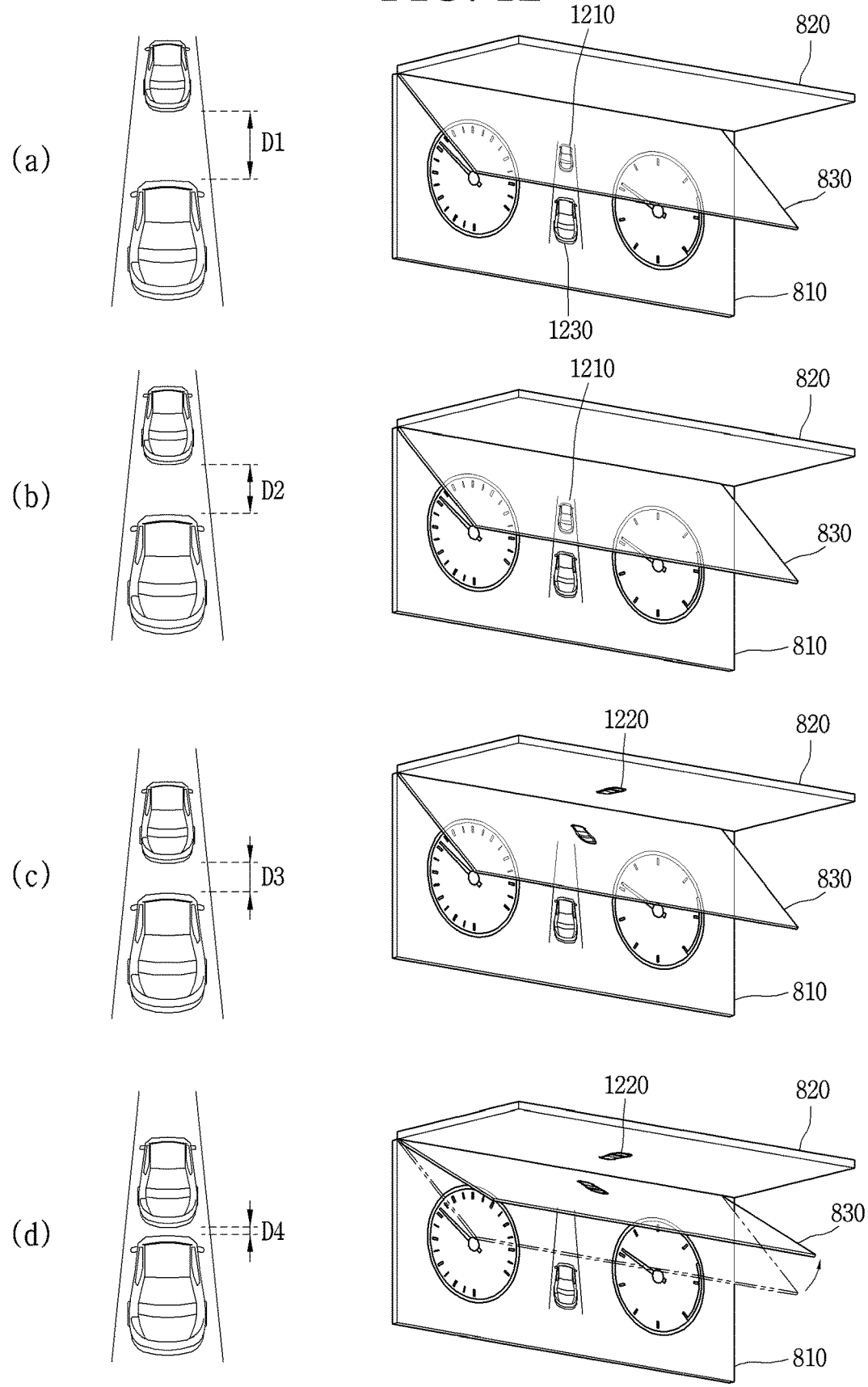

First, the processor 860 outputs the first graphic object on the first display 810 (S910). For example, as illustrated in FIG. 10, direction guidance information 1010 for guiding a route to a destination can be displayed on the first display 810 in a turn by turn (TBT) manner. The direction guidance information 1010 may be the first graphic object. As another example, the first graphic object may be speed limit information 1110 for guiding the speed limit of a currently-traveling road as illustrated in FIG. 11, or object information 1210 for guiding an object with possibility of collision as illustrated in FIG. 12.

Next, the processor 860 displays the second graphic object on the second display 820 based on a traveling state (driving state or running state) of the vehicle 100 (S930). The processor 860 controls the second display 820 such that the second graphic object corresponding to the first graphic object is displayed on the second display 820 when a preset condition is satisfied while the first graphic object is displayed on the first display 810. The preset condition may be variously set, and the display device 800 may further include a memory (not illustrated) for storing such various preset conditions.

The processor 860 can determine whether at least one of the preset conditions is satisfied according to the running state of the vehicle 100, and determine a type of the second graphic object to be displayed and whether or not to display the second graphic object. The processor 860 can determine the running state of the vehicle based on vehicle driving information received through the communication unit 850. That is, the second graphic object to be displayed on the second display 820 may be selected based on the vehicle driving information.

For example, as illustrated in FIG. 10, when a point at which the vehicle 100 should change a direction (or a point at which the driver should pay attention) is located within a first reference distance range, the first graphic object 1010 can be displayed on the first display 810. Thereafter, when the point is located within a second reference distance range due to the movement of the vehicle 100, a second graphic object 1020 corresponding to the first graphic object 1010 can be displayed on the second display 820. Since the second graphic object 1020 is displayed by overlapping the first graphic object 1010, the passenger confirms a short distance left up to the point.

As another example, as illustrated in FIG. 11, when the vehicle 100 enters a road on which a speed limit is set or enters a speed enforcement zone in which the speed limit is cracked down, the first graphic object 1110 can be displayed on the first display 810. Further, when a current speed of the vehicle 100 is faster than the speed limit, the second graphic object 1120 can be displayed on the second display 820 to guide or slow down the current speed. When the second graphic object 1120 is displayed on the second display 820, the first graphic object 1110 displayed on the first display 810 may disappear from the first display 810, thereby producing an effect that the first graphic object 1110 pops out from the back to the front. Alternatively, an overlapping effect for emphasizing specific information may also be produced by simultaneously displaying the first and second graphic objects 1110 and 1120 on the first and second displays 810 and 820, respectively.

Next, the processor 860 can tilt the light synthesizing unit 830 based on the running state (or the vehicle driving information) (S950). In more detail, the processor 860 can control the driving unit 840 to vary the first angle. As the light synthesizing unit 830 is tilted, a distance between one point of the light synthesizing unit 830 and the first display 810 is changed and accordingly a depth value of the second graphic object displayed on the second display 820 is changed. In other words, the processor 860 can adjust the depth value for the second graphic object by controlling the driving unit 840. The passenger can feel the effect that the second graphic object approaches or gets farther away from him/her as the first angle is changed.

For example, referring to FIG. 10, before the second graphic object 1020 is displayed, the light synthesizing unit 830 can be tilted such that the first angle is a minimum angle. The light synthesizing unit 830 can be tilted such that the first angle can be changed from the minimum angle to a maximum angle as the vehicle 100 moves (or the point to switch the direction of the vehicle is getting close) after the second graphic object is displayed. The second graphic object 1020 has a minimum depth value at a point where the reference angle is the minimum angle, and has a maximum depth value at a point where the reference angle is the maximum angle. As a result, the passenger can intuitively perceive that the point to switch the direction of the vehicle is gradually approaching. Afterwards, when the vehicle passes through the point, the second graphic object 1020 may disappear from the second display 820 and the light synthesizing unit 830 can be tilted such that the first angle has the initial setting value.

As another example, referring to FIG. 11, the light synthesizing unit 830 can be tilted such that the first angle has a predetermined angle, and the predetermined angle may depend on a speed of the vehicle 100. The first angle may near the maximum angle as a current speed increases, and may near the minimum angle as the current speed slows down. Since the second graphic object 1120 has a larger depth value as the current speed is faster, the passenger can feel a sense of speed for the current speed in a stereoscopic manner.

As another example, referring to FIG. 12, when there is an external object having possibility of collision with the vehicle 100, the processor 860 can display object information guiding the external object on the first display 810 as a first graphic object 1210. In more detail, when the possibility of collision is a first level or a distance from the external object is within a first reference distance range, the processor 860 controls the first display 810 to display the first graphic object 1210. Further, a vehicle object 1230 indicating the vehicle 100 can be displayed together with the first graphic object 1210. The vehicle object 1230 and the first graphic object 1210 can be displayed spaced apart from each other in proportion to distances d1 to d4 between the vehicle 100 and the external object.

The processor 860 can control the second display 820 to display a second graphic object 1220 when the possibility of collision is a second level or the distance from the external object is within a second reference distance range. And, the processor 860 can control the driving unit 840 to change the first angle according to the distance from the external object or the possibility of collision with the external object.

When an object having possibility of collision is present, notification information informing the object can be provided by a first graphic object in a 2D manner or by a second graphic object in a 3D manner according to the possibility of collision. In addition, since the first angle of the light synthesizing unit varies according to the possibility of collision, the notification information can be more effectively transmitted to the passenger.

In addition in FIG. 12, when the possibility of collision is lower than a reference value, the processor 860 can control the first and second displays 810 and 820 such that the first and second graphic objects 1210 and 1220 disappear, and control the driving unit such that the first angle has the initial setting value.

As mentioned above, the first display 810 can display first light that forms first visual information, and the second display 820 can display second light that forms second visual information. Since the first light is transmitted directly through the light synthesizing unit 830, the user recognizes that the first visual information is displayed on the first display 810. Further, since the second light is reflected by the light synthesizing unit 830, the user can recognize that the second visual information is displayed on the light synthesizing unit 830. Due to a distance between the light synthesizing unit 830 and the first display 810, the second visual information is recognized as being displayed on the first visual information, and the first visual information and the second visual information may obtain three-dimensional (3D) depth.

In addition, the display device 800 according to an embodiment of the present invention may generate three screens that are physically spaced apart from one another using the first and second displays 810 and 820 to display different information.

Figure 13A:
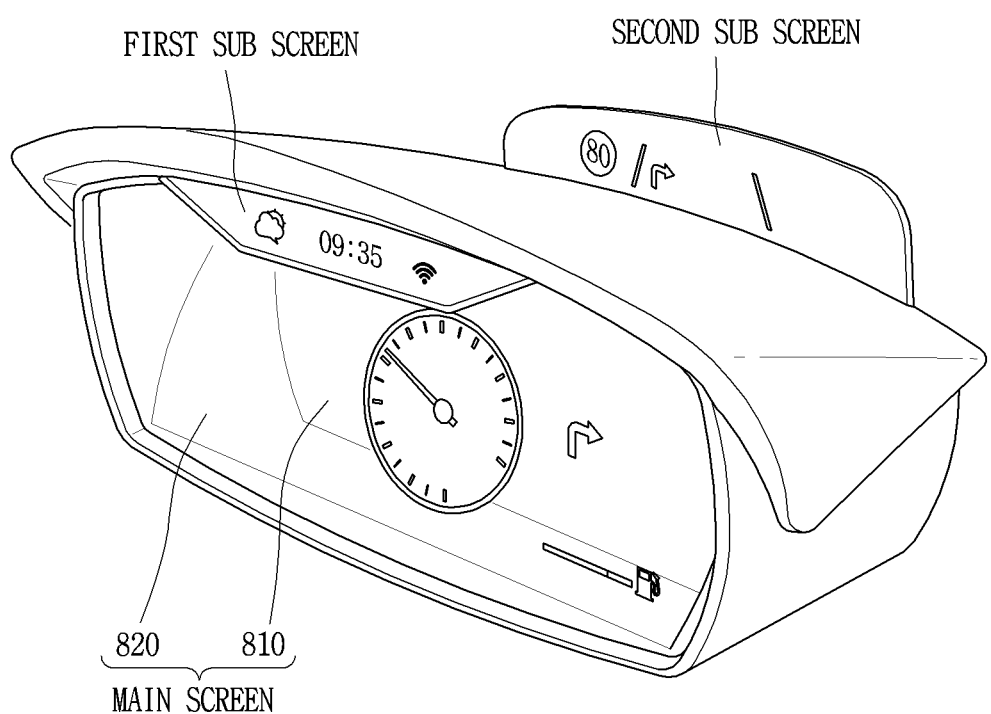
FIG. 13A is an exemplary view illustrating a display device that provides three screens physically spaced apart from one another by using two displays in accordance with an embodiment of the present invention.
Figure 13B:
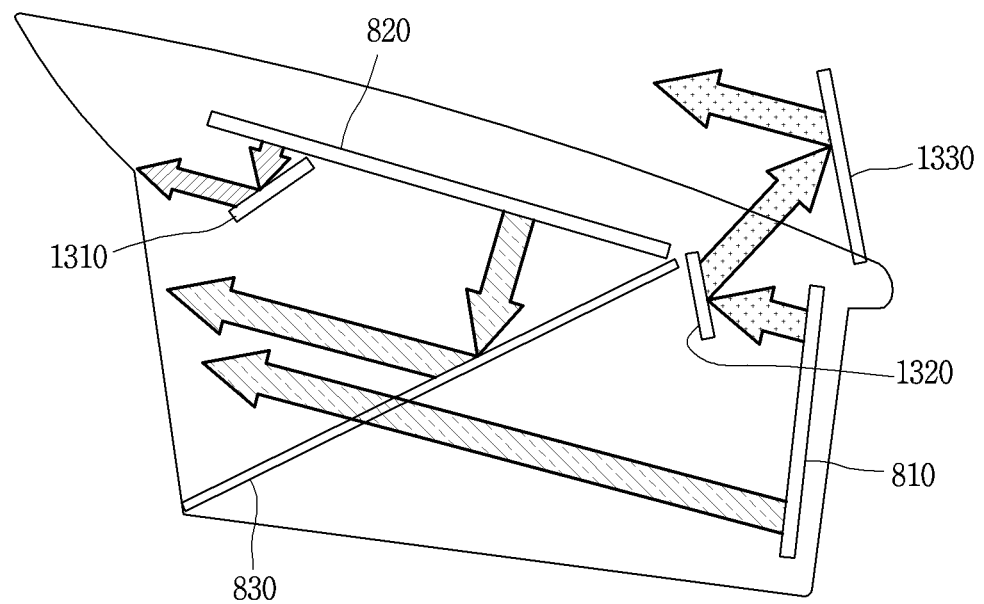
FIG. 13B is a sectional view of the display device illustrated in FIG. 13A in accordance with an embodiment of the present invention.

FIG. 13A is an exemplary view illustrating a display device providing three screens physically spaced apart from one another using two displays, and FIG. 13B is a sectional view of the display device illustrated in FIG. 13A. Referring to FIG. 13A, the display device 800 may have one main screen and two sub-screens. The main screen includes at least one of first visual information displayed on the first display 810, and second visual information displayed on the second display 820 and reflected by the synthesizing unit 830.

Although the first visual information is displayed on the first display 810 and the second visual information is displayed on the synthesizing unit 830, the first and second visual information can be displayed in a region defined by the main screen in an overlapping manner. In other words, the main screen may include a first main screen displaying the first visual information thereon, and a second main screen displaying the second visual information thereon. In this instance, the first main screen may correspond to the first display 810, and the second main screen may correspond to the light synthesizing unit 830.

First light forming the first visual information is output from the first display 810 and transmitted through the light synthesizing unit 830. Second light forming the second visual information is output from the second display 820 and reflected by the light synthesizing unit 830. In addition, the first light and the second light are directed to the same path by the light synthesizing unit 830 and reach the user.

Further, the processor 860 controls at least one of the first and second displays 810 and 820 so that various information can be displayed on the main screen in a 2D or 3D manner. When the output is performed in the 2D manner, the first display 810 displays the first visual information. Further, the second display 820 can be turned off or can display an image having a predetermined color. Here, the predetermined color may be black.

Even if the image is transmitted to the user through the light synthesizing unit 830, the user does not recognize the image, and the first visual information is transmitted in the 2D manner. Since the first visual information displayed on the first display 810 is the only information transferred to the user through the light synthesizing unit 830, the display device 800 provides the first visual information in the 2D manner. The 2D manner refers to "a method in which information displayed on the display device 800 is recognized by the user as being located on one surface." In addition, the surface may be flat or spherical, and the first visual information may include, for example, speed and a fuel level of the vehicle 100 as general information to be displayed on a dashboard, and may also include the vehicle driving information.

When the output is performed in the 3D manner, the first display 810 displays the first visual information, and the second display 820 displays the second visual information. Since an image of the second visual information is formed on the light synthesizing unit 830, a 3D depth is generated by a difference in distance between the light synthesizing unit 830 and the first display 810. Here, the 3D manner refers to "a method in which the first information and the second information displayed on the display device 800 are recognized by the user as being located on different surfaces."

In addition, the display device 800 may further include a first sub screen and a second sub screen as well as the main screen. In other words, the display device 800 may further be provided with the first and second sub screens as well as the main screen using the first and second displays 810 and 820. Since a separate display is not added, a fabricating cost of the display device 800 is reduced.

First, the first sub screen will be described. Referring to FIG. 13B, third visual information corresponding to part of the second light output from the second display 820 is displayed on the first sub screen. Specifically, the display device 800 includes a first reflector 1310 that reflects part of the second light directed toward the light synthesizing unit 830 to be directed toward a first direction, and the first reflector 1310 can be defined as a first sub screen on which the third visual information is formed. In addition, the first reflector 1310 is disposed on the second display 820 by forming a predetermined angle with the second display 820. Hereinafter, an angle between the second display 820 and the first reflector 1310 is defined as 'first sub angle.' Since the third visual information is displayed on the second display 820 and should be transmitted to the user located in front of the display device 800, the first sub angle forms an acute angle.

Figure 14:
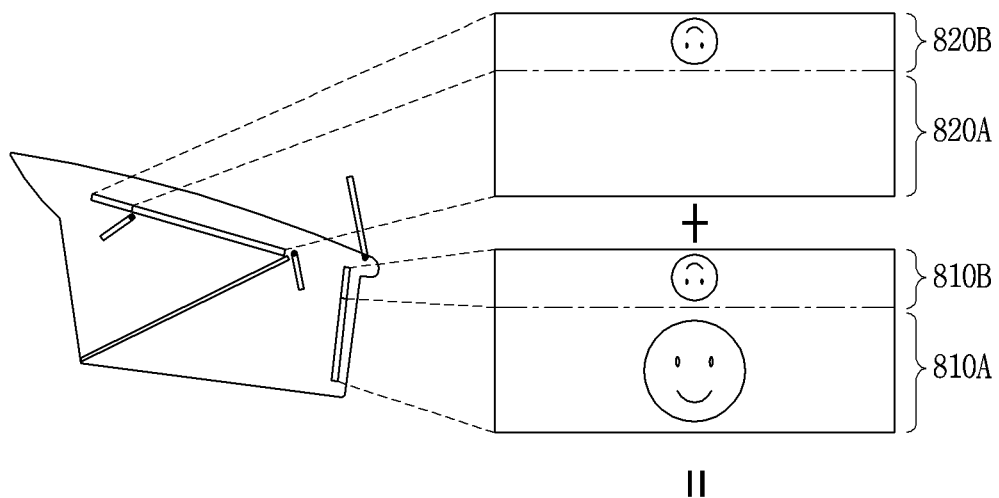
FIG. 14 is an exemplary view illustrating an operation of a display device for providing three screens in accordance with an embodiment of the present invention.
Figure 14:
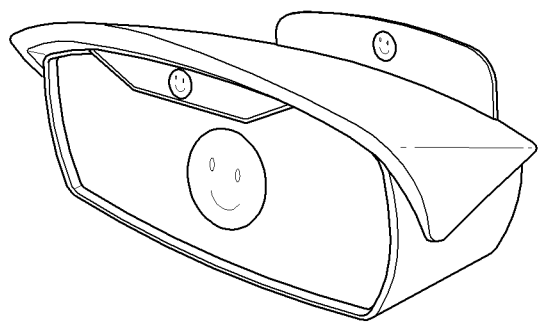

As shown in FIG. 14, the second display 820 can be divided based on the first reflector 1310 into a first part 820A from which light is output toward the light synthesizing unit 830, and a second part 820B from which light is output toward the first reflector 1310. The first part 820A outputs light corresponding to the second visual information which is output on the main screen, and the second part 820B outputs light corresponding to the third visual information which is output on the first sub screen.

In addition, the first reflector 1310 may be a half mirror, like the light synthesizing unit 830, which partially reflects and partially transmits light, or may be a full mirror which reflects all light. When the first reflector 1310 is configured as the half mirror, the first light output from the first display 810 passes through the first reflector 1310 and the second light output from the second display 820 is partially reflected by the first reflector 1310. In this instance, the first sub screen can provide various types of information in the 2D or 3D manner, like the main screen.

When the first reflector 1310 is configured as the half mirror, the first reflector 1310 is made transparent. In other words, the first sub screen may be made transparent. When the first reflector 1310 is configured as the full mirror, the first light output from the first display 810 is blocked by the first reflector 1310. In this instance, since the first sub screen provides only part of the second light output from the second display 820, the first sub screen can provide information only in the 2D manner.

When the first reflector 1310 is configured as the full mirror, the first light output from the first display 810 can be reflected by one surface of the first reflector 1310 to act as disturbance. When the first light is unintentionally reflected on one surface of the first reflector 1310 and reaches the light synthesizing unit 830, various types of information can overlap each other on the light synthesizing unit 830. This overlapping of information causes the user to be unable to clearly recognize the information displayed on the main screen.

In order to solve this problem, when the first reflector 1310 is configured as the full mirror, a material which absorbs light can be applied on one surface of the first reflector 1310, namely, a surface facing the first display 810. In this instance, the first reflector 1310 can be positioned between the second display 820 and the light synthesizing unit 830, and restrict part of the second light output from the second display 820 from being directed toward the light synthesizing unit 830.

In addition, the first sub screen is located at the closest place to the user among the screens provided by the display device 800. According to this characteristic in position, the third visual information provided on the first sub screen may include 'basic information' to be always provided to the user and/or 'notification information' according to an event occurrence, regardless of the driving state of the vehicle. This is because the first sub screen corresponds to a screen through which the user can check information in the easiest and quickest way. Here, the basic information is always displayed while power is supplied to the display device 800, and may include at least one of current time information, temperature information, and driving status information indicating whether the vehicle is in an autonomous driving mode or a manual driving mode.

Further, fourth visual information corresponding to part of the first light output from the first display 810 is formed on the second sub screen. Specifically, the display device 800 includes a second reflector 1320 that reflects part of the first light directed toward the light synthesizing unit 830 to a second direction different from the first direction. The second reflector 1320 can also be disposed on the second display 820 by forming an angle with the first display 810. Hereinafter, the angle between the first display 810 and the second reflector 1320 is defined as 'second sub angle.'

The light reflected by the second reflector 1320 toward the second direction forms the fourth visual information. An image of the fourth visual information may be formed on the windshield of the vehicle 100 or may be formed on a screen 1330 provided on the display device 800. When the fourth visual information is formed on the windshield of the vehicle 100, the windshield is defined as the second sub screen. When the fourth visual information is formed on the screen 1330, the screen 1330 is defined as the second sub screen. The second sub screen displays virtual information generated in the display by overlapping the real world, and thus may correspond to a head-up display implementing augmented reality. The screen 1330 is made transparent so that the user can check the real world located in front of the user. In other words, the second sub screen may be made transparent.

Hereinafter, for the sake of explanation, description will be given of an example in which the separately provided screen 1330 other than the windshield of the vehicle 100 corresponds to the second sub screen. The screen 1330 described below can also be replaced by the windshield of the vehicle 100.

As shown, the second reflector 1320 is located between the first display 810 and the light synthesizing unit 830 and blocks part of the first light from being directed to the light synthesizing unit 830. The blocked light is reflected by the second reflector 1320 to be directed to the screen 1330 and forms the fourth visual information on the screen 1330. Since the fourth visual information is output from the first display 820 and should be transmitted to the user located in front of the display device 800, the second sub angle forms an acute angle. The screen 1330 may also be disposed at an obtuse angle or 180° with respect to the first display 810.

In addition, the first display 810 can be divided based on the second reflector 1320 into a first part 810A outputting light to the light synthesizing unit 830, and a second part 810B outputting light to the second reflector 1320. The first part 810A outputs light corresponding to the first visual information which is output on the main screen, and the second part 810B outputs light corresponding to the fourth visual information which is output on the second sub screen.

Further, the second reflector 1320 may be a half mirror, like the light synthesizing unit 830, which partially reflects and partially transmits light, or may be a full mirror that reflects all light. When the second reflector 1320 is configured as the full mirror, one surface of the second reflector 1320 facing the light synthesizing unit 830 may be coated with a material that absorbs light. This is to prevent part of the light output from the second display 820 from being reflected by the second reflector 1320 to act as disturbance when the part of the light is transmitted through the light synthesizing unit 830 and directed toward the second reflector 1320.

Further, the second reflector 1320 may be formed to be concave such that the fourth visual information output from the first part 810A of the first display 810 can be enlarged to correspond to a size of the screen 1330. In this instance, the fourth visual information can be output in a first size from the first part 810A, but may be enlarged into a second size due to being reflected by the second reflector 1320 to be displayed on the screen 1330.

Next, FIG. 14 is a conceptual view illustrating an operation of a display device for providing three screens. FIG. 14 shows an example in which various pieces of information output on the first and second displays are displayed on three different screens. The first display 810 may be divided into the first part 810A and the second part 810B, and the second display 820 may also be divided into a first part 820A and a second part 820B. The first part 810A of the first display 810 and the first part 820A of the second display 820 provide information to the main screen. For example, the first part 810A of the first display 810 provides a background image of the main screen, and the first part 820A of the second display 820 provides a graphic object having a 3D depth on the background image. The second part 810B of the first display 810 provides information to the second sub screen and the second part 820B of the second display 820 provides information to the first sub screen.

In addition, the processor 860 controls at least one of the first and second displays 810 and 820 to provide various information to the three screens. In particular, since the fourth visual information displayed on the second sub screen is inverted up and down by the second reflector 1320, when the fourth visual information is output, the processor 860 controls the first display 810 so that the fourth visual information is output by being inverted up and down.

Further, a reference direction is defined based on information output on the first part 810A of the first display 810. In more detail, the reference direction refers to a direction from an upper end to a lower end of text when the text is displayed on the first part 810A of the first display 810. Information displayed on the second part 810B of the first display 810 is displayed by being inverted up and down with respect to the reference direction.

For example, when a message reception notification occurs, the processor 860 controls the first display 810 such that a notification icon is displayed on the second part 810B of the first display 810 as the fourth visual information. Further, the notification icon is displayed on the second part 810B of the first display 810 while inverted up and down. In addition, the notification icon is inverted up and down again by being reflected by the second reflector 1320. Therefore, the user is provided with a notification icon in a correct state without being inverted.

As such, three different screens arranged at different positions can be implemented using two displays. Since the positions of the main screen and the first and second sub screens are different, a different depth is formed in information displayed on each screen, and thus stereoscopic information is provided. In addition, the display device 800 according to an embodiment of the present invention can selectively activate or deactivate at least one of the two sub screens. For example, the main screen and the two sub screens can all be provided in a first state, but only the main screen can be provided in a second state. In the second state, the two sub screens may disappear from the display device 800.

Figure 15:
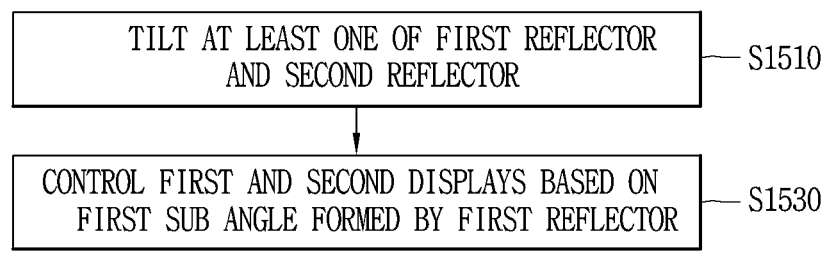
FIG. 15 is a flowchart illustrating a method of selectively providing at least one of three screens that can be provided in accordance with an embodiment of the present invention.
Figure 16:
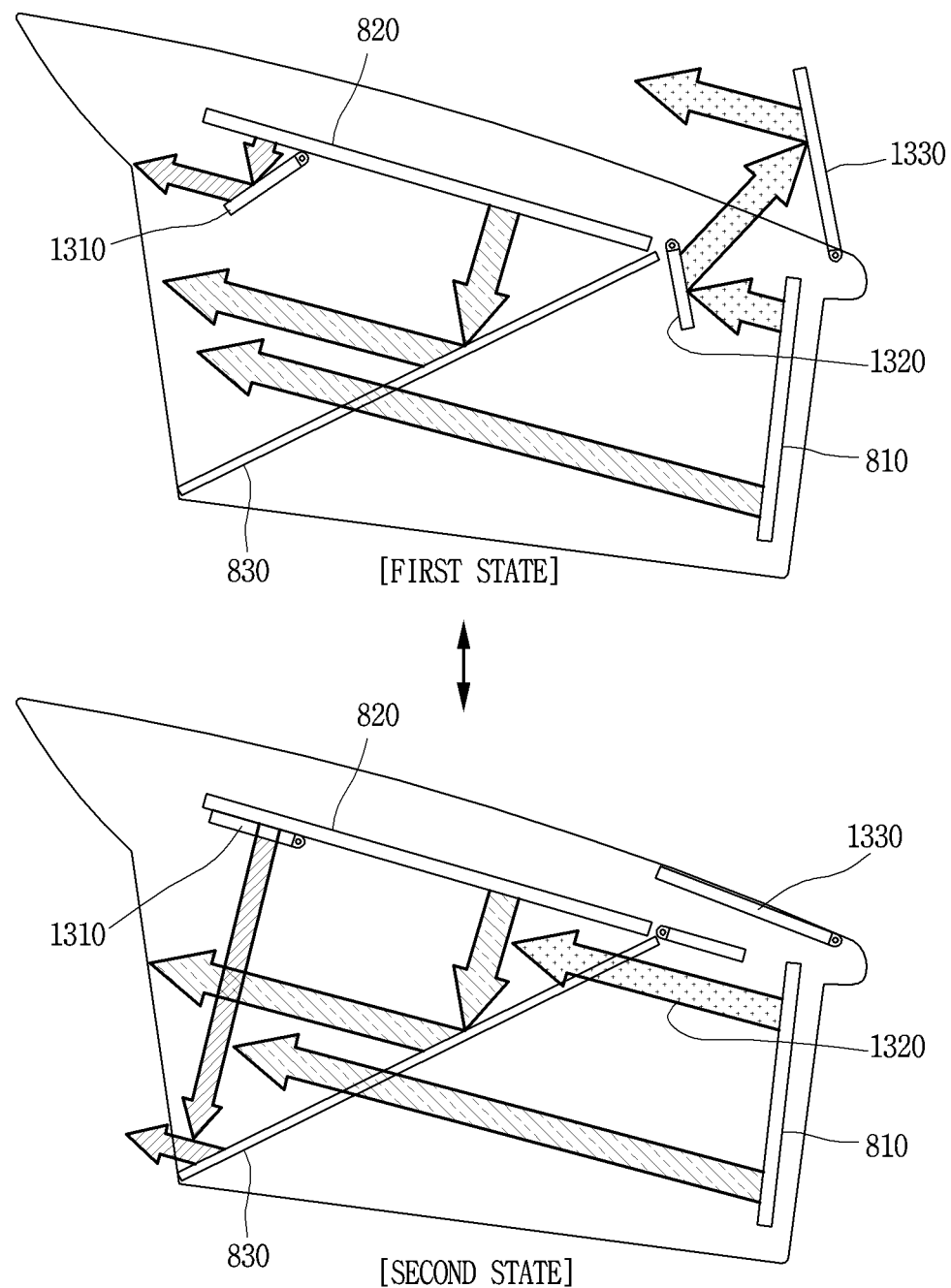
FIG. 16 is an exemplary view illustrating first and second embodiments of FIG. 15.

Next, FIG. 15 is a flowchart illustrating a method of selectively providing at least one of three screens that can be provided by the display apparatus 800, and FIG. 16 is an exemplary view illustrating first and second embodiments of FIG. 15. Referring to FIG. 16, the first reflector 1310 is tiltable to vary the first sub angle, and the second reflector 1320 is tiltable to vary the second sub angle.

Further, the screen 1330 can be disposed to form a predetermined angle (hereinafter, referred to as 'screen angle') with the first display 810, and be tiltable to vary the screen angle. The screen 1330 and the second reflector 1320 can be rotated in opposite directions to each other to be in at least one of a first state of facing each other and a second state of being in parallel to each other.

In addition, the display device 800 can further include at least one driving unit having a rotating shaft for providing driving force for tilting each of the first reflector 1310, the second reflector 1320 and the screen 1330. The first reflector 1310 is coupled to the rotating shaft of the driving unit to be tilted between the second display 820 and the light synthesizing unit 830, and the second reflector 1320 is coupled to the rotating shaft of the driving unit to be tilted between the first display 810 and the light synthesizing unit 830.

Also, the processor 860 can control the at least one driving unit to adjust at least one of the first sub angle, the second sub angle, and the screen angle. More specifically, the processor 860 controls the at least one driving unit such that at least one of the first sub angle, the second sub angle, and the screen angle can vary according to a preset condition.

For example, the preset condition can be a user input that is input through the user input unit provided in the vehicle 100 or the display device 800. In other words, the user can select at least one of the first sub angle, the second sub angle, and the screen angle using the user input unit, and change the selected at least one angle. Accordingly, the user can selectively adjust an angle optimized for him or her, which results in providing a customized user interface.

In another example, the preset condition may be related to speed of the vehicle 100. Because the three screens are located at different positions, an optimized screen for providing information to the user may depend on speed. The processor 860 can select at least one of the three screens according to the speed of the vehicle 100. Thereafter, the processor 860 can activate the selected screen and deactivate the unselected screens. The activation refers to providing information through the corresponding screen, and the deactivation refers to the corresponding screen disappearing from the display device 800 or information not being provided through the screen.

As illustrated in FIG. 16, the main screen and the two sub screens can all be provided in the first state, but only the main screen can be provided in the second state. In the second state, the two sub screens can disappear from the display device 800.

In the first state in which the first sub angle is within a first range, the first reflector 1310 reflects part of the second light to be directed toward the first direction. Further, in the second state in which the first sub angle is within a second range, the first reflector 1310 allows part of the second light to be transmitted through the first reflector 1310 to be directed toward the light synthesizing unit 830.

In addition, the third visual information output on the second part 820B of the second display 820 is displayed on the first sub screen in the first state but displayed on the main screen in the second state. In the second state, the third visual information is reflected by the light synthesizing unit 830 and has a depth value in the first range accordingly.

In the first state, the third visual information is displayed on the first sub screen. Further, in the second state, the third visual information is displayed on the main screen because the third visual information passes through the first reflector 1310. The third visual information is displayed adjacent to an upper end of the first display 810 in the first state, but is displayed adjacent to a lower end of the first display 810 in the second state. That is, the third visual information is output at the same position but is displayed at a different position with respect to the main screen according to the first state or the second state.

The fourth visual information output on the second part 810B of the first display 810 is displayed on the second sub screen in the first state but displayed on the main screen in the second state. More specifically, in the second state, the fourth visual information passes through the light synthesizing unit 830 and has a depth value in the second range accordingly.

In the second state, the display device 800 operates in a 'default mode' described in FIGS. 8A and 8B. In the default mode, the first and second displays 810 and 820 and the light synthesizing unit 830 have sizes corresponding to one another. Accordingly, in the default mode, a graphic object output on the second display 820 has a different depth value according to its output position. Further, the preset condition may be related to vehicle driving information generated from at least one processor provided in the vehicle 100, as well as the speed of the vehicle 100.

Based on this structure, the processor 860 controls one or more driving units so that at least one of the first reflector 1310 and the second reflector 1320 is tilted (S1510). The processor 860 adjusts at least one of the first reflector 1310 and the second reflector 1320 according to the preset condition. Next, the processor 860 controls the first and second displays 810 and 820 based on the first sub angle formed by the first reflector 1310 (S1530).

Hereinafter, description will be given of a method of controlling the first and second displays 810 and 820 based on the first sub angle, with reference to FIGS. 17A and 17B. In particular, FIGS. 17A and 17B are conceptual views illustrating the operation of the display device according to the second embodiment described with reference to FIG. 16.

The first sub angle is located within the first range in the first state, but is located within the second range in the second state. Here, the first range and the second range refer to different ranges. In addition, the first range refers to a predetermined range in which the first sub screen is activated, and the second range refers to a predetermined range in which the first sub screen is deactivated. For example, the second range may include '0°' at which the second display 820 and the first reflector 1310 are in parallel to each other.

Figure 17A:
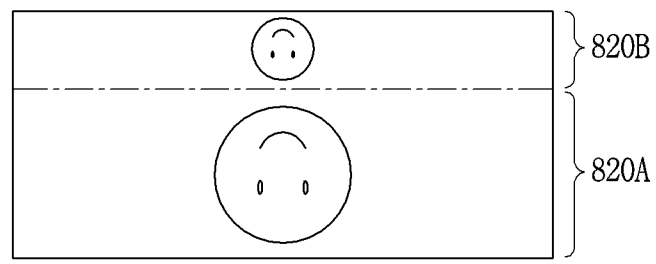
FIGS. 17A and 17B are conceptual views illustrating an operation of the display device in the second embodiment illustrated in FIG. 16.
Figure 17A:
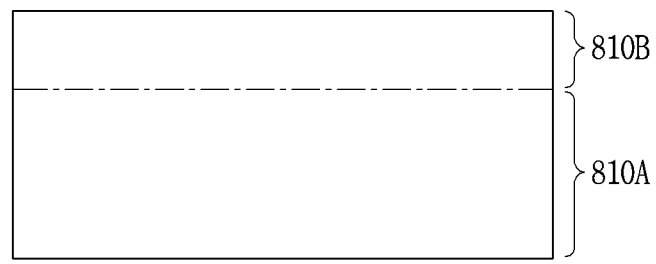
Figure 17A:
Figure 17A:
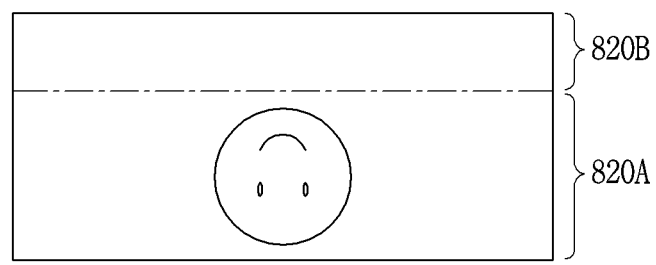
Figure 17A:
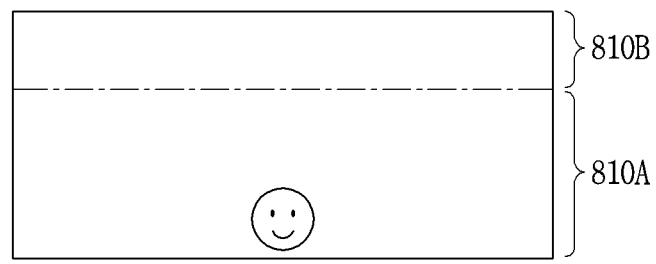
Figure 17B:
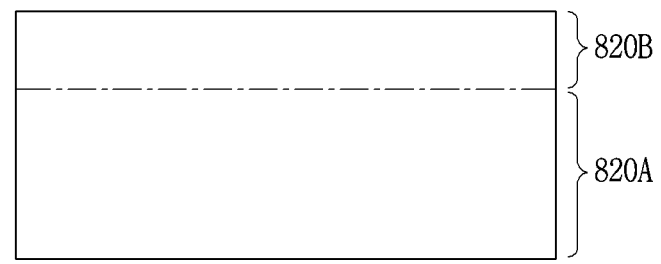
Figure 17B:
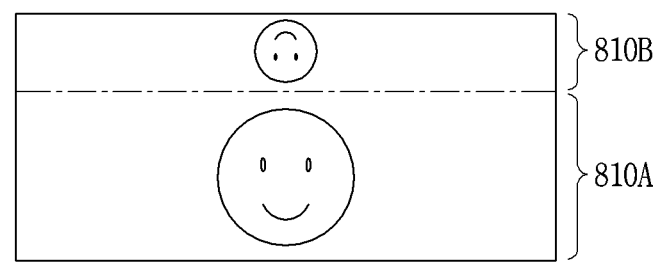
Figure 17B:
Figure 17B:
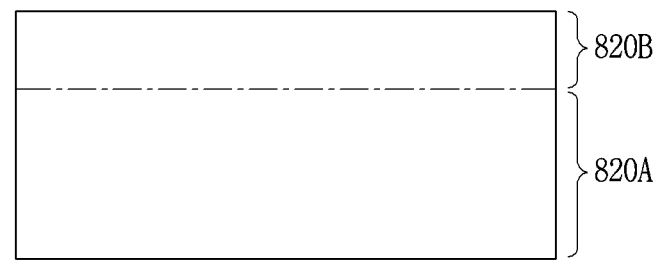
Figure 17B:
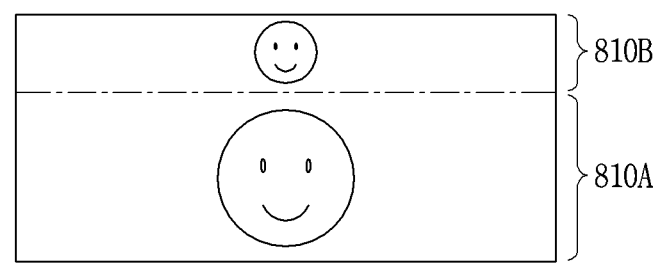

As the first state is switched to the second state, the third visual information output on the second part 820B of the second display 820 is changed in output position as illustrated in FIG. 17A, or inverted up and down as illustrated in FIG. 17B. When the first sub angle is changed while a graphic object is output on one of the first display and the second display, the graphic object may be moved from the one display to another.

For example, as illustrated in FIG. 17A, the processor 860 can control the first and second displays 810 and 820 such that the graphic object currently output on the second part 820B of the second display 820 disappears from the second display 820 and is output on the first display 810. That is, the graphic object may move from the second display 820 to the first display 810.

Further, as illustrated in FIG. 17B, the graphic object can be displayed as it is on the first display 810 without being moved, but may be inverted up and down again with respect to the reference direction. This is because light is not reflected by the second reflector 1320 but is transmitted through the light synthesizing unit 830 to be displayed on the main screen. The processor 860 selectively inverts up and down information output on the second part 810B of the first display 810, as at least part of information output on the first display 810, according to the second sub angle.

Figure 18:
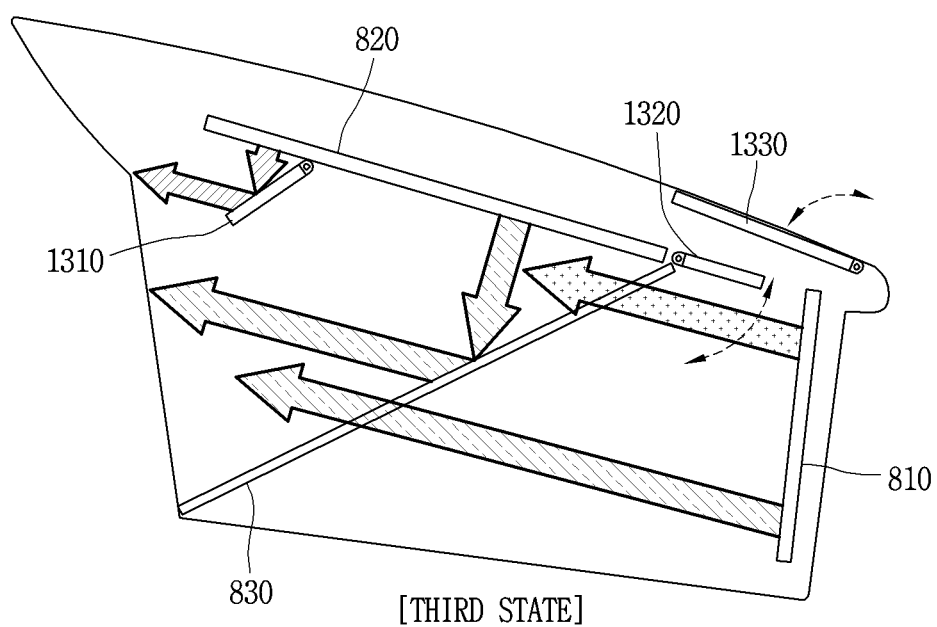
FIG. 18 is an exemplary view illustrating a third embodiment of FIG. 15.
Figure 19:
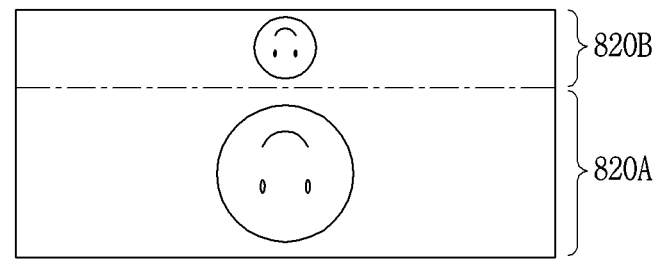
FIG. 19 is a conceptual view illustrating an operation of the display device in the third embodiment illustrated in FIG. 18.
Figure 19:
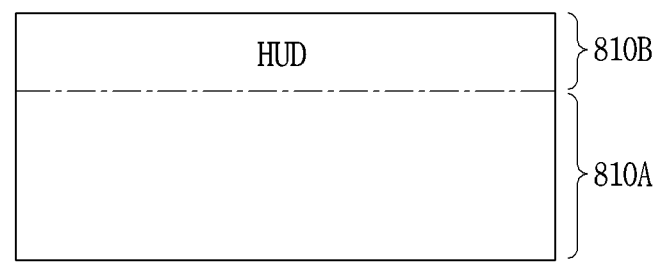
Figure 19:
Figure 19:
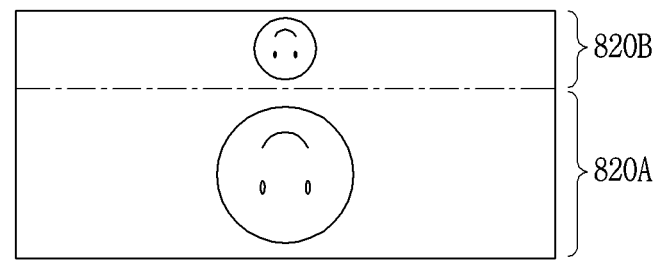
Figure 19:
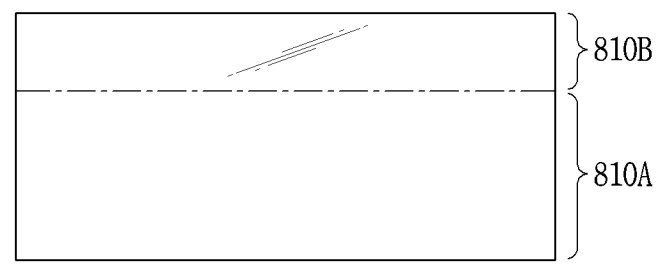

Next, FIG. 18 is an exemplary view illustrating the third embodiment of FIG. 15, and FIG. 19 is a conceptual view illustrating the operation of the display device according to the third embodiment described with reference to FIG. 18. In more detail, the processor 860 can control the second sub display to disappear from the display device 800 based on the vehicle driving information. Specifically, the processor 860 can adjust the second sub angle and the screen angle so that only the main screen and the first sub screen are left. The state illustrated in FIG. 18 is defined as a 'third state' or a 'third embodiment.'

In addition, the processor 860 can determine, based on the vehicle driving information, whether the user is in an environment suitable for using a head-up display. When the user is in an environment which is unsuitable for using the head-up display, the processor 860 can control the at least one driving unit such that the third state is set (selected, activated).

For example, when the vehicle 100 travels to a position where the sun is up (i.e., a position facing the sun), information displayed on the head-up display may not be recognized by the user due to light emitted from the sun. The processor 860 can determine that the environment is inappropriate for using the head-up display based on various information received from an illumination sensor and a position information sensor, and may control the at least one driving unit such that the third state is set (selected, activated). Since the fourth visual information displayed on the second part 810B of the first display 810 in the third state is blocked by the first reflector 1310, the user is unable to check the fourth visual information.

The processor 860, as illustrated in FIG. 19, can turn off the second part 810B of the first display 810 to prevent consumption of the battery due to an unnecessary output of information that the user is unable to check. In addition, in the drawing, the processor 860 can control the first display 810 to output an image having a predetermined color, such as black, on the second part 810B. This is to prevent light output from the second part 810B of the first display 810 from acting as disturbance.

Figure 20:
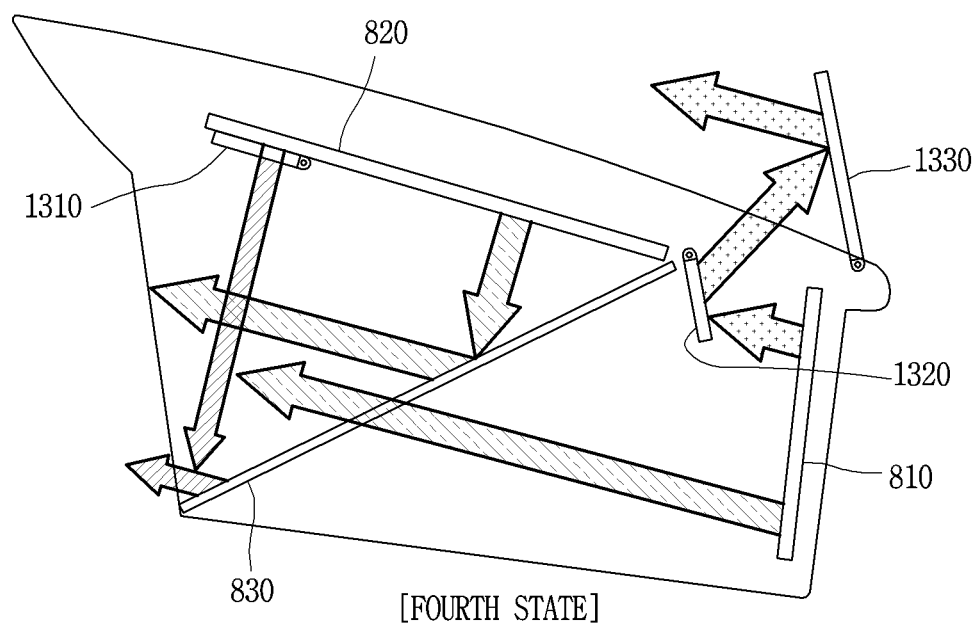
FIG. 20 is an exemplary view illustrating a fourth embodiment of FIG. 15.

Next, FIG. 20 is an exemplary view illustrating the fourth embodiment of FIG. 15. As illustrated in FIG. 20, the processor 860 can cause the first sub display to disappear from the display device 800 based on the vehicle driving information. Specifically, the processor 860 can adjust the first sub angle such that only the main screen and the second sub screen are left. The state illustrated in FIG. 20 is defined as a 'fourth state' or a 'fourth embodiment'.

As described above, the display device 800 according to an embodiment of the present invention can control the at least one driving unit such that one of the first to fourth states can be set according to the vehicle driving information. This results in providing an optimal user interface to the user aboard the vehicle 100.

The present invention can be implemented as computer-readable codes (applications or software) in a program-recorded medium. The method of controlling the autonomous vehicle can be realized by a code stored in a memory or the like. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display device for a vehicle, the display device comprising:
   a first display configured to output first light forming first visual information;
   a second display configured to output second light forming second visual information;
   a light synthesizing unit located on an advancing path of each of the first light and the second light and forming a first acute angle with the first display and a second acute angle with the second display and configured to transmit therethrough the first light from the first display and reflect the second light from the second display;
   a first tiltable reflector configured to reflect part of the second light directed toward the light synthesizing unit to be directed toward a first direction; and
   a second tiltable reflector configured to reflect part of the first light directed toward the light synthesizing unit to be directed toward a second direction different from the first direction,
   wherein the first display includes a first part that outputs light to the second tiltable reflector and a second part that outputs light to the light synthesizing unit, and
   wherein a reference direction is defined based on information output on the first part of the first display, and information output on the second part of the first display is output by being inverted up and down with respect to the reference direction.

2. The display device of claim 1, further comprising a driving unit configured to:
   tilt the first tiltable reflector to form the first angle with the second display so the first tiltable reflector reflects part of the second light directed toward the light synthesizing unit toward the first direction, and
   tilt the second tiltable reflector to form the second angle with the first display so the second tiltable reflector reflects part of the first light directed toward the light synthesizing unit toward the second direction different from the first direction.

3. The display device of claim 2, wherein the driving unit is further configured to:
   tilt the first tiltable reflector to be substantially parallel with the second display so the first tiltable reflector transmits the part of the second light directed toward the light synthesizing unit and the light synthesizing unit reflects the light transmitted by the first tiltable reflector, and
   tilt the second tiltable reflector to be substantially parallel with the first display so the second tiltable reflector does not reflect the part of the first light directed toward the light synthesizing unit.

4. The display device of claim 2, wherein the first tiltable reflector is tiltable to vary the first angle, and
   wherein the second tiltable reflector is tiltable to vary the second angle.

5. The display device of claim 4, wherein the first tiltable reflector is configured such that the part of the second light is reflected by the first tiltable reflector toward the first direction when the first angle is located within a first range, and the part of the second light is transmitted through the first tiltable reflector toward the light synthesizing unit when the first angle is located within a second range.

6. The display device of claim 5, wherein the driving unit comprises a rotating shaft providing driving force,
   wherein the first tiltable reflector is coupled to the rotating shaft to be tilted between the second display and the light synthesizing unit, and
   wherein the driving unit is controlled based on a speed of the vehicle.

7. The display device of claim 4, further comprising a processor configured to control the first display so that an image having a predetermined color is output on a part of the first display when the second angle satisfies a predetermined condition.

8. The display device of claim 4, further comprising a processor configured to selectively invert up and down at least part of the first visual information according to the second angle.

9. The display device of claim 4, further comprising a processor configured to adjust at least one of the first angle and the second angle based on a user input.

10. The display device of claim 4, wherein a graphic object is output by being moved from one of the first display and the second display to another display when the first angle is varied while the graphic object is output on the one of the first display and the second display.

11. The display device of claim 4, wherein the third display is disposed to form a third angle with the second tiltable reflector, and is tiltable to vary the third angle.

12. The display device of claim 11, wherein the third display and the second tiltable reflector are configured to be rotated in mutually opposite directions to be in one of a first state of facing each other and a second state of being parallel to each other.

13. The display device of claim 2, further comprising a processor configured to control the driving unit to adjust the first angle based on a speed of the vehicle.

14. The display device of claim 2, further comprising a processor configured to control the driving unit to adjust the first angle based on a distance from the vehicle to an object external to the vehicle.

15. The display device of claim 1, wherein the first tiltable reflector is defined as a first screen on which third visual information, corresponding to the part of the second light, is formed, and
    wherein the display device further comprises a third display on which fourth visual information, corresponding to the part of the first light reflected toward the second direction, is formed.

16. The display device of claim 15, wherein the first screen and the third display are made transparent.

17. The display device of claim 1, wherein the first tiltable reflector is located between the second display and the light synthesizing unit, and blocks the part of the second light from being directed to the light synthesizing unit.

18. The display device of claim 1, wherein the second tiltable reflector is located between the first display and the light synthesizing unit, and blocks the part of the first light from being directed to the light synthesizing unit.

19. The display device of claim 18, wherein one surface of the second tiltable reflector facing the light synthesizing unit is coated with a material that absorbs light.

* * * * *